United States Patent [19]
Shimizu et al.

[11] Patent Number: 5,899,294
[45] Date of Patent: May 4, 1999

[54] ELECTRIC POWER STEERING DEVICE

[75] Inventors: Yasuo Shimizu; Katsuji Watanabe, both of Wako, Japan

[73] Assignee: Honda Giken Kogyo Kabushiki Kaisha, Tokyo, Japan

[21] Appl. No.: 08/858,656

[22] Filed: May 19, 1997

[30] Foreign Application Priority Data

| May 17, 1996 | [JP] | Japan | ................................... 8-123739 |
| Jan. 7, 1997 | [JP] | Japan | ................................... 9-000987 |

[51] Int. Cl.$^6$ ........................................................ B62D 5/04
[52] U.S. Cl. .......................................... 180/444; 180/443
[58] Field of Search .................................. 180/443, 444; 192/38, 44, 54.52

[56] References Cited

U.S. PATENT DOCUMENTS

| 3,084,774 | 4/1963 | Liang ........................................ 192/44 |
| 4,621,701 | 11/1986 | Takabayashi et al. ................... 180/444 |
| 4,676,331 | 6/1987 | Iwaki et al. .............................. 180/444 |
| 4,852,707 | 8/1989 | Ito et al. ................................... 180/444 |
| 4,901,831 | 2/1990 | Ito et al. ................................... 192/38 |
| 5,016,740 | 5/1991 | Ito et al. ................................... 192/38 |
| 5,027,915 | 7/1991 | Suzuki et al. ............................ 180/443 |
| 5,135,084 | 8/1992 | Ito et al. ................................... 192/38 |
| 5,355,981 | 10/1994 | Itoh et al. ................................. 192/35 |
| 5,429,218 | 7/1995 | Itoh et al. ................................. 192/38 |
| 5,429,219 | 7/1995 | Itoh et al. ............................. 192/48.92 |
| 5,743,350 | 4/1998 | Yamawaki et al. ...................... 180/444 |

FOREIGN PATENT DOCUMENTS

| 0 752 360 | 1/1997 | European Pat. Off. . |
| 2 620 185 | 3/1989 | France . |
| 1-69829 | 3/1989 | Japan . |
| 2 209 569 | 5/1989 | United Kingdom . |

*Primary Examiner*—Anne Marie Boehler
*Assistant Examiner*—Michael Cuff
*Attorney, Agent, or Firm*—Merchant, Gould, Smith, Edell, Welter & Schmidt, P.A.

[57] ABSTRACT

In an electric power steering device of the type wherein an input member connected to an electric motor and an output shaft including an output member connected to a steering wheel are connected via a plurality of sets of friction clutch mechanisms for transmitting an auxiliary torque from the electric motor to the output shaft, the output member is displaceable in a radial direction relative to the input member. In response to rotation of position control members of the friction clutch mechanisms, one of the friction clutch mechanisms sets is disengaged whereupon a force or pressure exerted from the locking members of the other friction clutch mechanism sets to the output member forces the output member to move in the radial direction relative to the input member. With this movement of the output member, a frictional engagement force acting between the locking members and the input and output members is reduced. Thus, the friction clutch mechanisms can be readily disengaged by a force which is much smaller than the force required to disengage all the friction clutch mechanisms at one time.

14 Claims, 20 Drawing Sheets

ELECTRIC POWER STEERING DEVICE

BACKGROUND OF THE INVENTION

1. Field of the Invention

The present invention relates to improvements in an electric power steering device.

2. Description of the Related Art:

In recent years, an electric power steering device has been used extensively to as the muscular effort or force required to steer or turn the steering handle can be reduced and hence provides a comfortable steering touch to the driver. The electric power steering device of the type concerned is constructed such that an auxiliary torque generated by an electric motor in proportion to the steering torque is transmitted via a mechanical clutch to the steering system. One example of such electric power steering device is disclosed in Japanese Patent Laid-open Publication No. SHO 64-69829, entitled "Clutch Device".

The disclosed electric power steering device includes a cylindrical outer member connected to an electric motor, a shaft including a polygonal inner member connected to a steering wheel, and a clutch device for selectively connecting the internal member and the external member. The clutch device is composed of a plurality of friction clutch mechanisms disposed on the same circle. The clutch mechanisms each include a pair of wedge-shaped spaces (tapering spaces) defined between the inside surface of the cylindrical outer member and the outside surface of the polygonal inner member, a pair of rollers disposed in the wedge-shaped spaces, respectively, a spring acting between the rollers, and a retainer for positioning the rollers. The rollers selectively engage and disengage the outer member and the inner member (to engage and disengage the clutch device) in response to the movement of the retainer in a circumferential direction.

In general, at the initial stage of a steering motion of the steering wheel (caused when the steering wheel is turned back from one direction to the opposite direction, for example), only a very small steering torque is developed and, hence, the motor is not activated. Thus, no auxiliary torque is transmitted to the clutch device. Accordingly, in order to disengage the clutch device, a force which is greater than a frictional force required to lock up the rollers must be exerted. This clutch-releasing force should preferably be as small as possible so that the driver can get a comfortable steering touch.

On the other hand, when the need arises due to some reasons, the clutch device must be smoothly disengageable even though transmission of the auxiliary torque from the motor to the steering system is still continuing. In this case, clutch releasing operation requires a greater clutch-releasing force than as usual, posing a greater burden to the driver.

SUMMARY OF THE INVENTION

It is accordingly an object of the present invention to provide an electric power steering device including a mechanical clutch which can be smoothly disengaged by a small manual effort or force.

To attain the foregoing object, the present invention provides an electric power steering device including an electric motor for generating an auxiliary torque according to a steering torque, and a plurality of sets of friction clutch mechanisms for transmitting the auxiliary torque to a steering system including an output shaft connected to a steering wheel. The friction clutch mechanisms comprise: an input member connected to the electric motor; an output member disposed concentrically with the input member with an annular space defined therebetween and connected to the output shaft; a plurality of tapering spaces defined between an inside surface of one of the input member and the output member and an outside surface of the other of the input member and the output member; a plurality of locking members movably disposed in the tapering spaces, respectively, for selectively engaging and disengaging the input and output members; a plurality of urging members for urging the locking members toward a tapering direction of the tapering spaces; and a plurality of rotatable position control members connected to the steering handle for positioning the locking members. In response to rotation of the position control members, the locking members of the friction clutch mechanisms move into and out of wedging engagement between the inside surface and the outside surface to selectively engage and disengage the input member and the output member to thereby transmit the auxiliary torque from the electric motor to the output shaft. The input member and the output member are mounted such that they are relatively movable in a radial direction. When a selected one of the plurality of sets of friction clutch mechanisms is disengaged in response to rotation of the position control members, the input member and the output member are relatively displaced in the radial direction by a force exerted from the locking members of the remaining set of friction clutch mechanisms. With this relative movement, a frictional engagement force acting between the locking members of the remaining set of friction clutch mechanisms and the inside and outside surfaces of the input and output members is reduced.

With this construction, when part of the locking members is disengaged from the output member, forces or pressures applied from the individual locking members to the output member lose balance. The remaining locking members then force the output member to displace in the radial direction relative to the input member. With this displacement of the output member, a frictional engagement force acting between the remaining locking members and the output member is weakened or reduced. This makes it possible to disengage the remaining locking members with a small force just greater than the force of the urging members. Accordingly, the friction clutch mechanisms of the present invention can be readily disengaged by a force much smaller than the force required to disengage all the friction clutch mechanisms at one time.

Preferably, the output member and the output shaft are composed of two separate members structurally independent from each other, and the output member is mounted on the output shaft such that it is displaceable relatively to the output shaft in a radial direction thereof. To secure a reliable wedging engagement between the locking members and the input and output members, the output member generally has a complicated shape and configuration. However, since the output shaft and the output members of the present invention are structurally independent from each other, the output member can be manufactured easily at a relatively high rate of production.

It is preferable that the position control members are disposed on the same circle and spaced at regular intervals, and a selected one of the position control members used for positioning the selected one set of friction clutch mechanisms has a circumferential length greater than that of the remaining position control member so that the selected one set of friction clutch mechanisms can be disengaged before the remaining set of friction clutch mechanisms. By virtue of the difference in circumferential length between the position control members, the selected set of friction clutch mechanisms can be readily brought to the disengaged state in advance to disengagement of the remaining set of friction clutch mechanisms. As previously described, disengagement of the selected set of friction clutch mechanisms is immediately followed by the disengagement of the remaining set of friction clutch mechanisms which can be achieved by a force much smaller than the force required to disengage all the clutch mechanisms at one time.

The output member preferably has an engagement surface adapted for engagement with the locking members of the remaining set of friction clutch mechanisms, the engagement surface being sloped down in a direction opposite to the direction of displacement of the output member to thereby facilitate smooth displacement of the output member in the radial direction when the selected one set of friction clutch mechanisms is disengaged. This arrangement is effective to improve the reliability of the clutch disengaging operation.

It is also preferable that the electric power steering device further includes a resilient member for urging the output member toward the output shaft. When the clutch mechanisms are fully disengaged, the output member automatically returns from the radially displaced position to the original position by the resilient force of the resilient member. With the resilient member thus provided, the output member is able to repeat its reciprocating motion with high operation reliability so as to disengage the clutch mechanisms with a small force. The resilient member has a resilient force acting in a direction parallel to the direction of displacement of the output member. With the resilient force thus aligned with the direction of displacement of the output member, the output member is able to return to its original position smoothly without producing unpleasant operation noise. Thus, clutch mechanisms can therefore operate reliably and silently as a whole.

The output member is mounted on the output shaft preferably by an elastic member made of a material having a damping or shock-absorbing property, such as rubber. By virtue of the elastic member, striking noises which may be produced in the clutch mechanisms can be absorbed or attenuated to a greater extent. The power steering device as a whole has an improved soundproofness, which will increase the product value of the power steering device.

It is further preferable that one of the inside surface and the outside surface (frictional engagement surfaces) has a taper angle correcting portion for enabling each of the locking members to wedge between the inside and outside surfaces while keeping the substantially the same wedge angle even when the position of the locking member within the corresponding tapering space is changed due to relative movement between the input member and the output member. Since the wedge angle is kept constant, the wedging action attained by the locking member is also constant. Accordingly, the locking members can be disengaged from the inside and outside surfaces of the tapering space without requiring an additional clutch-disengaging force. It may occur that due to some reasons, the output member becomes eccentric to the input member and thus changes the position of the locking member within the tapering space. In this instance, however, the taper angle correcting portion operates to correct the position of the locking member so that the substantially constant wedge angle is resumed between the locking member and the frictional engagement surfaces. The taper angle correcting portion thus provided does not affect smooth disengaging operation of the clutch mechanisms which is achievable with a small clutch-disengaging force.

Preferably, part of the tapering spaces has an enlarged portion for receiving therein a part of the locking member to allow the locking member to separate from the inside and outside surfaces when the locking member is disengaged. The enlarged portion provides a greater space or clearance between the locking member and the frictional engagement surfaces when the locking member is in the disengaged position. This arrangement insures positive and reliable separation between the locking member and the frictional engagement surfaces and, hence, is able to increase the amount of relative movement between the input member and the output member. Thus the clutch mechanisms can be disengaged with improved reliability.

It is also preferable that at least one of the plural friction clutch mechanism sets is capable of being disengaged before the remaining friction clutch set, and the tapering spaces of the at least one set of friction clutch mechanisms each have the aforesaid enlarged portion. The early disengageable clutch mechanisms are always disengaged in advance to the disengagement of the remaining clutch mechanisms. The locking member of each of the early disengageable clutch mechanisms is received or accommodated in the enlarged portion of the tapering space as soon as it is forced to disengage the frictional engagement surfaces. The locking member received in the enlarged portion of the tapering space is clearly spaced from the frictional engagement surfaces, so that the plural sets of clutch mechanisms can be disengaged with enhanced smoothness and stability.

The above and other object, features and advantages of the present invention will become manifest to those versed in the art upon making reference to the detailed description and accompanying sheets of drawings in which preferred structural embodiments incorporating the principles of the present invention are shown by way of illustrative example.

DETAILED DESCRIPTION OF THE PREFERRED EMBODIMENTS

Figure 1:
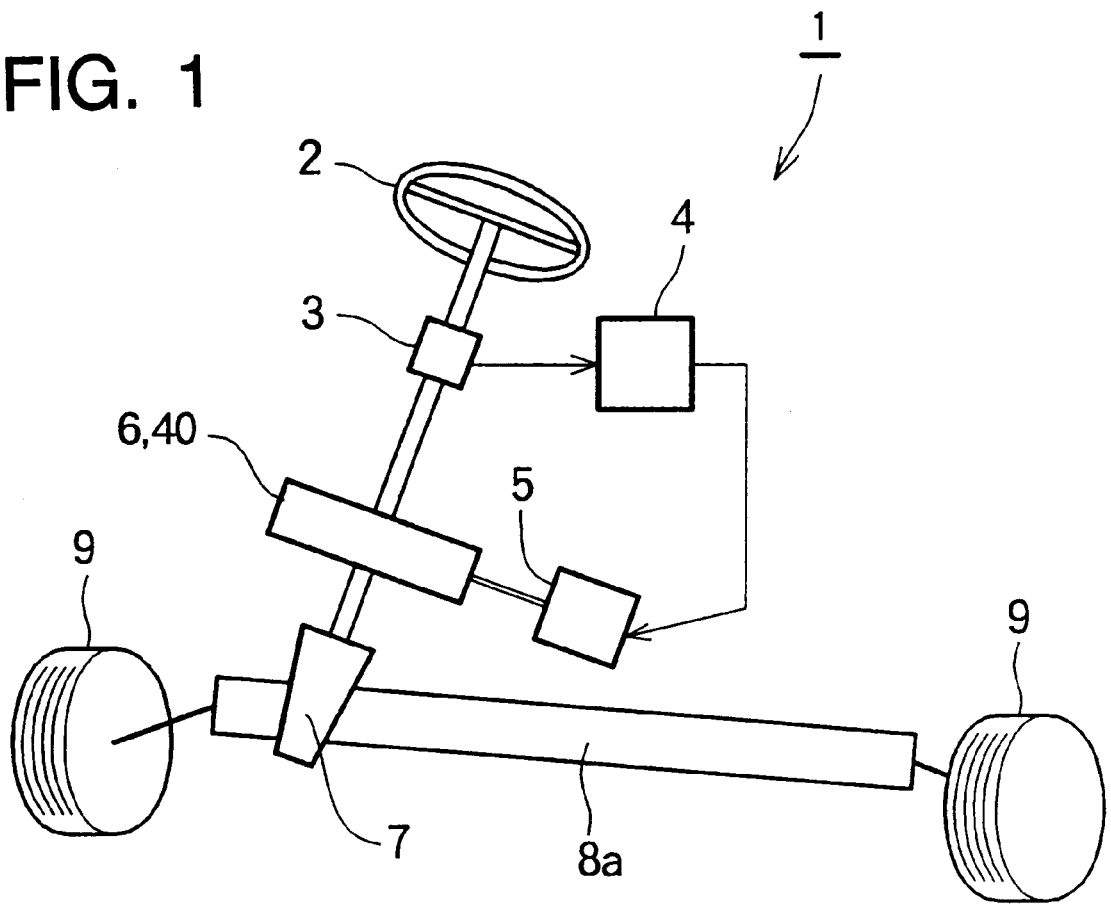
FIG. 1 is a diagrammatical view showing the general construction of an electric power steering device according to a first embodiment of the present invention.

Now, certain preferred embodiments of the present invention will be described below in greater detail with reference to the accompanying drawings, wherein like reference characters designate like or corresponding parts throughout the several views.

FIG. 1 diagrammatically shows the general construction of an electric power steering device according to the present invention. The electric power steering device 1 includes a steering torque detecting means or detector 3 for detecting a steering torque in a steering system generated when a steering wheel 2 is actuated, a control unit or controller 4 for generating a control signal according to a detection signal from the steering torque detector 3, an electric motor 5 for producing an auxiliary torque proportional to the steering torque based on the control signal from the controller 4, and a torque transmitting means or mechanism 6 and a mechanical clutch 40 that transmit the auxiliary torque from the electric motor 4 to a steering system. The electric power steering device 1 thus constructed is operative to steer a pair of wheels (steered wheels) 9, 9 via a pinion 7 and a rack 8a.

Figure 2:
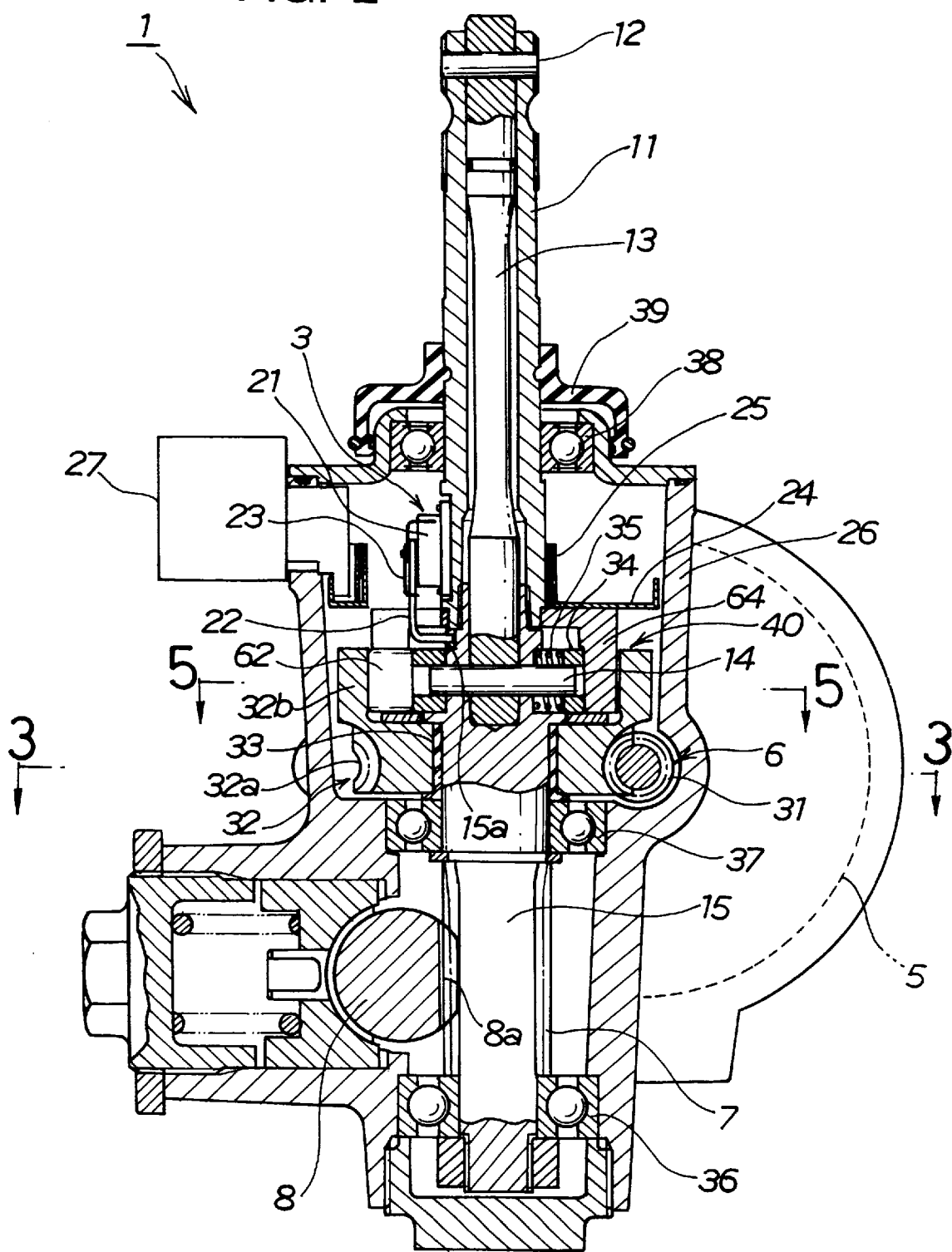
FIG. 2 is a cross-sectional view showing on enlarged scale an essential part of the electric power steering device.

FIG. 2 shows in enlarged cross section a main portion of the electric power steering device according to a first embodiment of the present invention. As shown in FIG. 2, the steering system is composed of a tubular input shaft 11 connected to the steering wheel 2 (FIG. 1), a torsion bar (resilient member) 13 inserted in the tubular input shaft 11 and connected at its upper portion to the input shaft 11 by means of a pin 12, and an output shaft 15 connected by a pin 14 to a lower portion of the torsion bar 13 and having a lower portion on which the pinion 7 is formed.

The torsion bar 13 is a member which is capable of producing a twist angle exactly proportional to the steering torque and which allows the input shaft 11 and the output shaft 15 to create a relative torsional displacement therebetween. The rack 8a is toothed on a rack shaft 8 extending in a direction perpendicular to the sheet of FIG. 2 and is held in mesh with the pinion 7. The input shaft 11, the torsion bar 13 and the output shaft 15 are concentrical with each other.

The steering torque detector 3 detects a steering torque in the steering system by detecting a relative twist angle between the input shaft 11 and the output shaft 15. In the illustrated embodiment, this device 3 is a potentiometer. The potentiometer (steering torque detector) 3 includes a detector body 21 containing within it a resistance element (not shown) and a sliding contact (not shown) slidable along the resistance element, and a lever-like actuator 22 pivotally movable to move or displace the sliding contact within the detector body 21.

The detector body 21 is attached by screws to an outer peripheral surface of a lower portion of the input shaft 11, while the lever-like actuator 22 has a fore-end engaged in an engagement groove 15a formed in an outer peripheral surface of an upper portion of the output shaft 15. With this arrangement, the steering torque detector 3 is able to detect a relative twist angle (angular displacement) between the input shaft 11 and the output shaft 15.

The steering torque detector 3 further has a torsion spring 23 for urging the lever-like actuator 22 against one sidewall of the engagement groove 15a to keep the actuator 22 in position against wobbling in a direction of pivotal movement of the actuator 22.

The input shaft 11 has an electric cable 25 wound in plural turns (three turns, for example) around a cable reel 24. The electric cable 25 is connected at one end thereof to the detector body 21 of the steering torque detector 3 and, at the other end, to a connector 27 on a housing 26.

The torque transmitting mechanism 6 includes an wheel 33 formed by a relatively thick cylindrical member rotatably supported on an upper portion of the output shaft 15 via a bushing 33. The cylindrical member (wheel) 33 has a toothed gear portion 32a and an annular input member 32b that are provided in succession from below to the above along an axis of the cylindrical member 33.

The mechanical clutch 40 is disposed inside the input member 32b and has a structure described below with reference to FIG. 5.

In FIG. 2, numerals 36, 37 and 38 denote bearings, and 39 denotes a dust cover.

Figure 3:
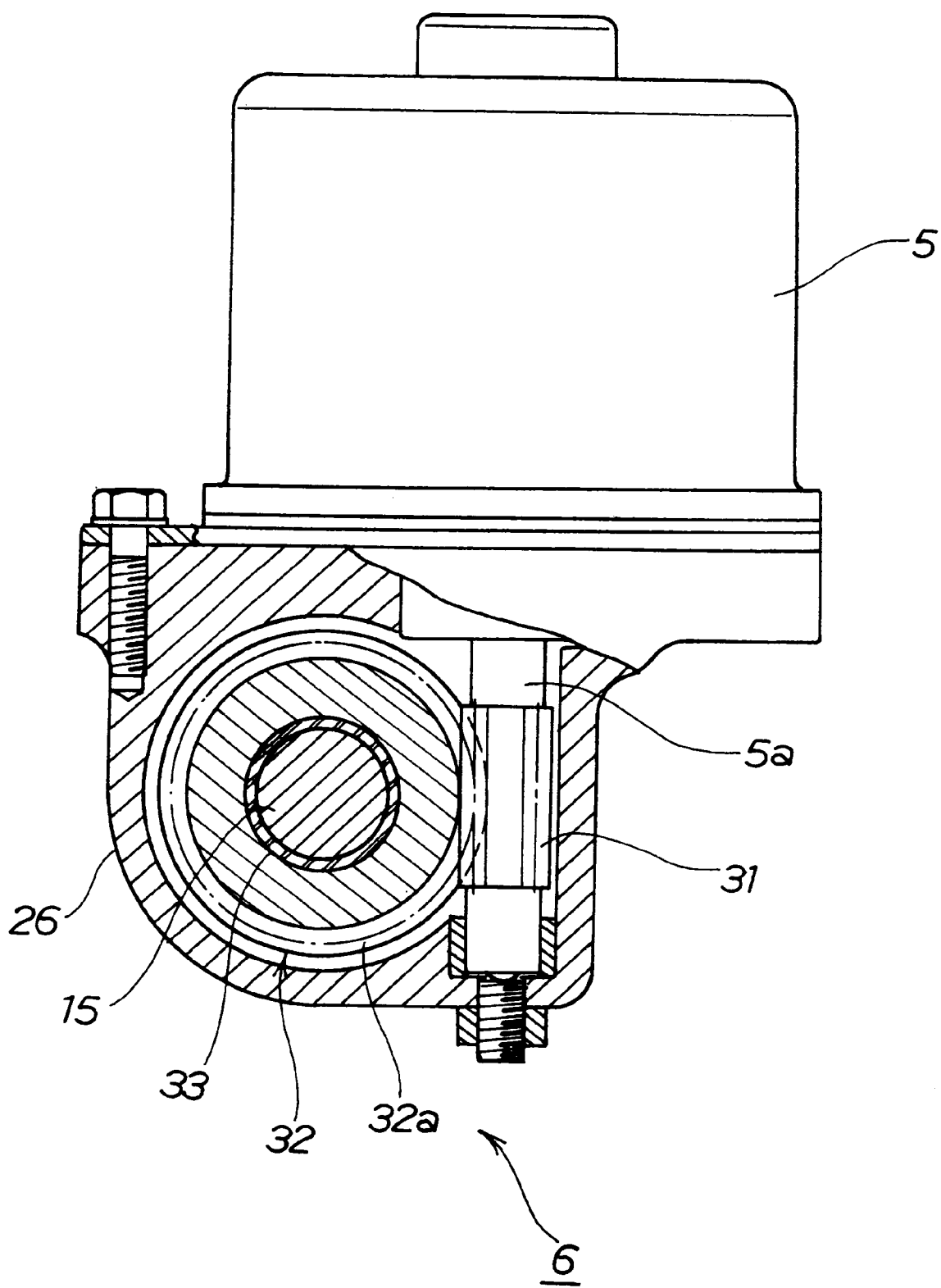
FIG. 3 is a cross-sectional view taken along line 3—3 of FIG. 2.

FIG. 3 is a cross-sectional view taken along line 3—3 of FIG. 2, showing a detailed cross section of the torque transmitting mechanism 6.

As shown in FIG. 3, the torque transmitting mechanism 6 is a worm gear mechanism which is composed of the worm 31 coupled to an output shaft 5a of the electric motor 5, and the wheel 32 rotatably supported on the output shaft 15. The electric motor 5 is bolted to the housing 26.

Thus, the rack 8 is driven via the pinion 7 by a combined torque which is a combination of the steering torque in the steering system (input shaft 11 torsion bar 13 output shaft 15) and the auxiliary torque from the electric motor 5.

Figure 4:
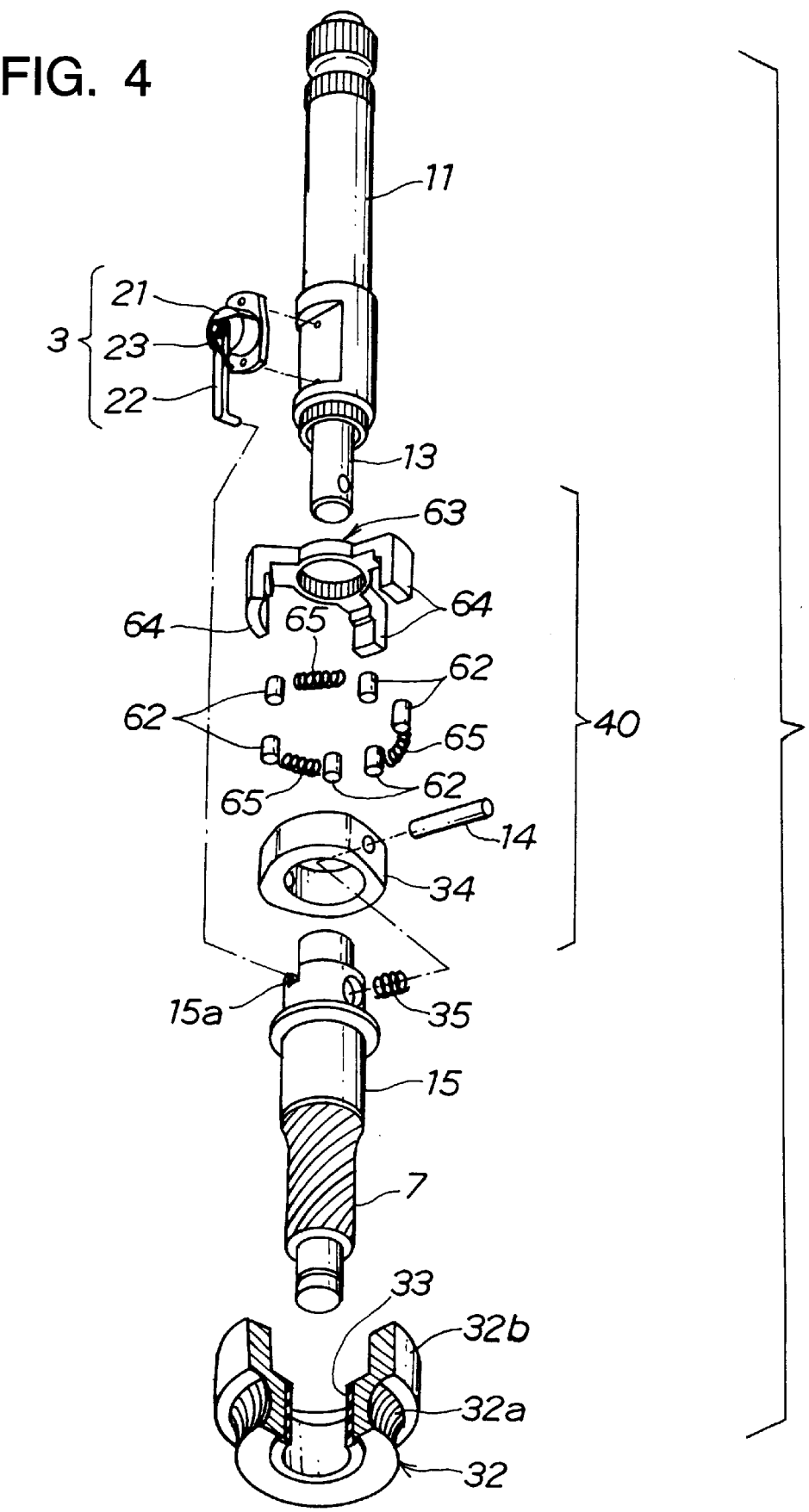
FIG. 4 is an exploded perspective view of a main portion of the electric power steering device.

FIG. 4 shows in exploded perspective a main portion of the electric power steering device. As shown in this figure, the input shaft 11 has a lower end connected by serration to a position control means or controller 63. The position controller 63 forms one structural component of the mechanical clutch 40 and has an annular or ring shape having a plurality (three in the illustrated embodiment) of position control members 64, 64, 64 extending downwards. The position controller 63 and, hence, the position control members 64 are connected to the steering handle 2 shown in FIG. 1. The output shaft 15 is provided with an annular output member 34 at an upper end portion thereof. The output member 34 is disposed concentrically with the input member 32b.

Figure 5:
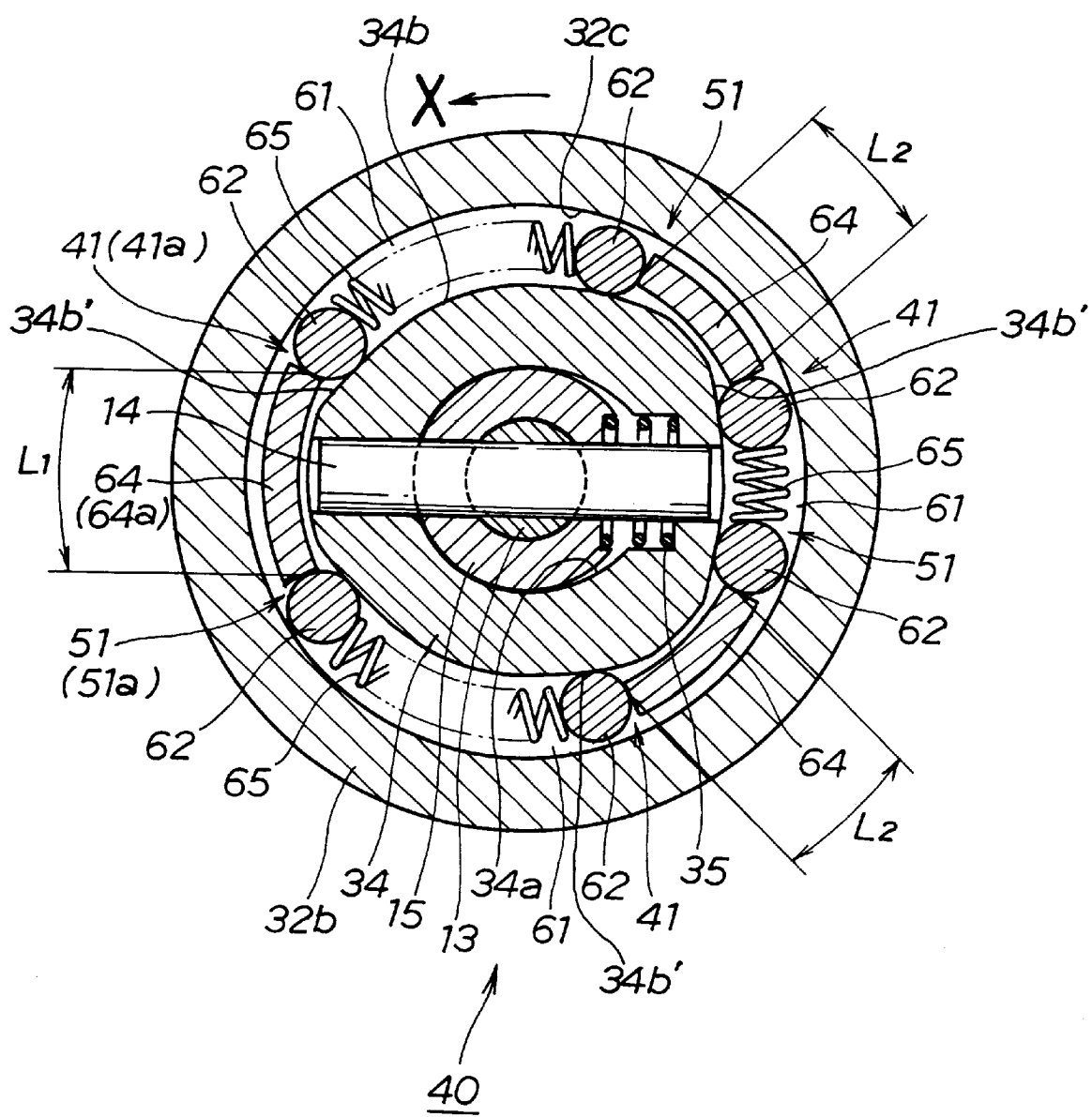
FIG. 5 is an enlarged cross-sectional view taken along line 5—5 of FIG. 2.

FIG. 5 is a cross-sectional view taken along line 5—5 of FIG. 2 and shows a detailed cross section of the mechanical clutch 40, with the housing 26 being omitted for clarity.

As shown in FIG. 5, the mechanical clutch 40 is the so-called one-way clutch assembly which transmits an auxiliary torque from the electric motor 5 to the steering system only when the acting direction of the auxiliary torque is coincident with the steering direction of the steering system. The mechanical clutch 40 is assembled by a plurality (three in the illustrated embodiment) of sets of friction clutch mechanisms disposed on the circumference of a circle.

These friction clutch mechanisms are separated into two groups each including three clutch mechanisms disposed alternately with the clutch mechanisms of the other group for transmitting an auxiliary steering torque in a particular direction. Stated more specifically, the first group of friction clutch mechanisms 41, 41, 41 are adapted to engage to transmit the auxiliary steering torque in the direction indicated by the arrow X (counterclockwise direction) in FIG. 5, while the second group of friction clutch mechanisms 51, 51, 51 are adapted to engage to transmit the auxiliary steering torque in a direction opposite to the arrow X (clockwise direction) shown in FIG. 5. Each of the first clutch mechanisms 41 and an adjacent one of the second clutch mechanisms 51 jointly form one of the plural (three) sets of clutch mechanisms.

The first and second groups of clutch mechanisms 41, 51 are composed of the auxiliary torque input member 32b, the output ember 34, a plurality (six in the illustrated embodiment) of tapering spaces 61 defined between the input and out members 32b, 34 and spaced in the circumferential direction of the input and output members 32b, 34, a plurality of locking members 62 in the form of rollers disposed in the tapering spaces 61, respectively, for engaging and disengaging the input and output members 32b, 34, the plural (three in the illustrated embodiment) position control members 64 for positioning locking members 62, and a plurality of urging members 37 in the form of compression coil springs for urging the respective locking members 62 toward the adjacent position control members 64 (in a direction toward a taper end of each tapering space 61).

The output member 34 has a generally isosceles triangular shape in cross section, having three sides curved outwardly with vertexes truncated.

The tapering spaces 61 are defined between a circular cylindrical inside surface 32c of the input member 32b and an engagement surface (a polygonal outside surface) 34b of the output member 34 and each have a tapering circumferential end. The position control members 64 are disposed on the same circle extending in an annular space defined between the input member 32b and the output member 34 and circumferentially spaced at equal intervals. The position control members 64 are simultaneously movable in the circumferential direction.

With the mechanical clutch 40 thus constructed, in response to the movement of the position control members 64 in the circumferential direction, the locking members 62 are moved into and out from wedging engagement with friction engagement surfaces defining the tapering spaces 61 so that the input member 32b and the output member 34 are selectively engaged and disengaged to transmit an auxiliary steering torque from the electric motor 5 to the output shaft 15. The friction engagement surfaces include the aforesaid cylindrical inside surface 32c (hereinafter referred to as "input side frictional engagement surface") of the input member 32b and engagement surface portions 34b' (hereinafter referred to as "output side engagement surfaces") of the polygonal outside surface 34b of the output member 34.

A selected one of the plural (three) clutch mechanism sets 41, 51 (hereinafter referred to as "selected first and second clutch mechanisms 41a, 51a) is so constructed as to move into the disengaged state in advance to the remaining clutch mechanism sets.

More specifically, one of the position control members 64 (hereinafter referred to as "selected position control member 64a") which is disposed between the respective locking members 61, 61 of the selected first and second clutch mechanisms 41a, 51a has a circumferential length $L_1$ which is greater than that $L_2$ of the remaining position control members 64. The selected position control member 64a is normally disposed in radial alignment with one truncated corner or vertex of the generally isosceles triangular output member 34, the remaining position control members 64 being in radial alignment with two other corners of the isosceles triangular output member 34 having the same angle.

The output member 34 is movable in a radial direction relatively to the input member 32b. To this end, the output member 34 is radially movably mounted on the output shaft 15. The output member 34 has a generally oblong or elliptical through-hole 34a in which the output shaft 15 of circular cross section is fitted. The pin 14 used for joining together the torsion bar 13 and the output shaft 15 also extends diametrically across the output member 34 with its axis lying in a major axis of the oblong through-hole 34a. A resilient member comprised of a compression coil spring 35 is loosely fitted around the pin 14 and acts between the output member 34 and the output shaft 15 to force an inner peripheral wall defining the through-hole 34a of the output member 34 against an outer peripheral surface of the output shaft 15.

More specifically, the resilient member 35 is disposed between the outer peripheral surface of the output shaft 15 and an inner peripheral wall portion of the through-hole 34a extending transversely across the major axis of the oblong through-hole 34a. With the resilient member 35 thus arranged, a resilient force of the resilient member 35 acts in a direction opposite to the direction of movement of the output member 34 relative to the output shaft 15 (along the major axis of the oblong through-hole 34a). Thus, the output member 34 is forced against the output shaft 15. The output member 34 is also urged toward a center of the width of the selected position control member 64a, in a manner described later on.

To ensure that the output member 34 is displaced in the radial direction when only one clutch mechanism (i.e., the selected first clutch mechanism 41a or the selected second clutch mechanism 51a) is disengaged, these output side engagement surfaces 34b' of the output member 34 which are adapted to engage the locking members 62 of the other clutch mechanisms 41, 51 have a downslope toward a direction opposite to the direction of movement of the output member 34. With the output side engagement surfaces 34b' thus profiled, when the selected clutch mechanism 41a or 51a is disengaged, the output member 34 can be smoothly displaced in the radial direction without subjected to a resistance from the locking members 62. This will insure subsequent reliable disengagement of the other two or remaining clutch mechanisms 41 or 51.

Now, operation of the mechanical clutch 40 will be described below with reference to FIGS. 1 and 6 through 9.

Figure 6:
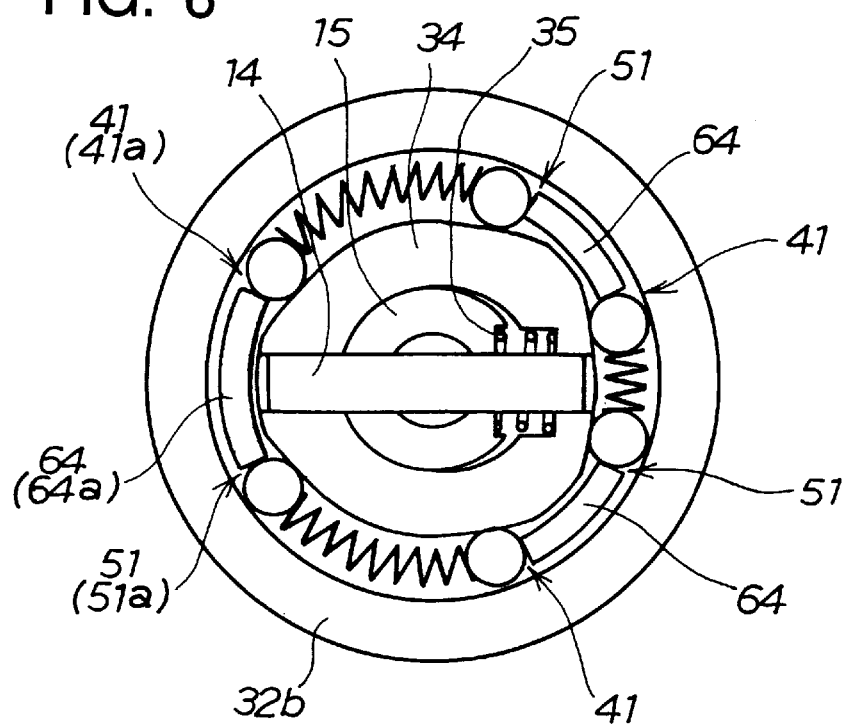
FIGS. 6 through 9 are diagrammatical views illustrative of the operation of a mechanical clutch of the electric power steering device.

When the steering wheel 2 (FIG. 1) is not actuated, no signal is generated from the steering torque detecting means 3 and, hence, no assist command signal is output from the control unit 4. Accordingly, the electric motor 5 is kept in the stationary or inoperating state. Thus, all the clutch mechanisms 41, 51 are in the disengaged state (neutral state), as shown in FIG. 6.

Then, when the the steering wheel 2 is steered in one direction (counterclockwise direction in FIG. 6, for example) with a light manual steering force (i.e., the steering torque on the steering wheel 2 is small), the electric motor 5 generates no auxiliary torque. Under such condition, no substantial change is observed in the relative position or phase between the position control members 64 coupled to the input shaft 11 (FIG. 2) and the output member 34. In this instance, the position control members 64 are slightly displaced in the counterclockwise direction, but the extent of angular displacement of the position control members 64 is still insufficient to engage the first clutch mechanisms 41. Thus, the output member 34 is turned or rotated by a steering torque in the steering system (input shaft 11 torsion bar 13 output shaft 15) to drive the output shaft 15, without being influenced by a friction between the locking members 62 and the input member 32b or an inertial force produced by the electric motor 5.

Figure 7:
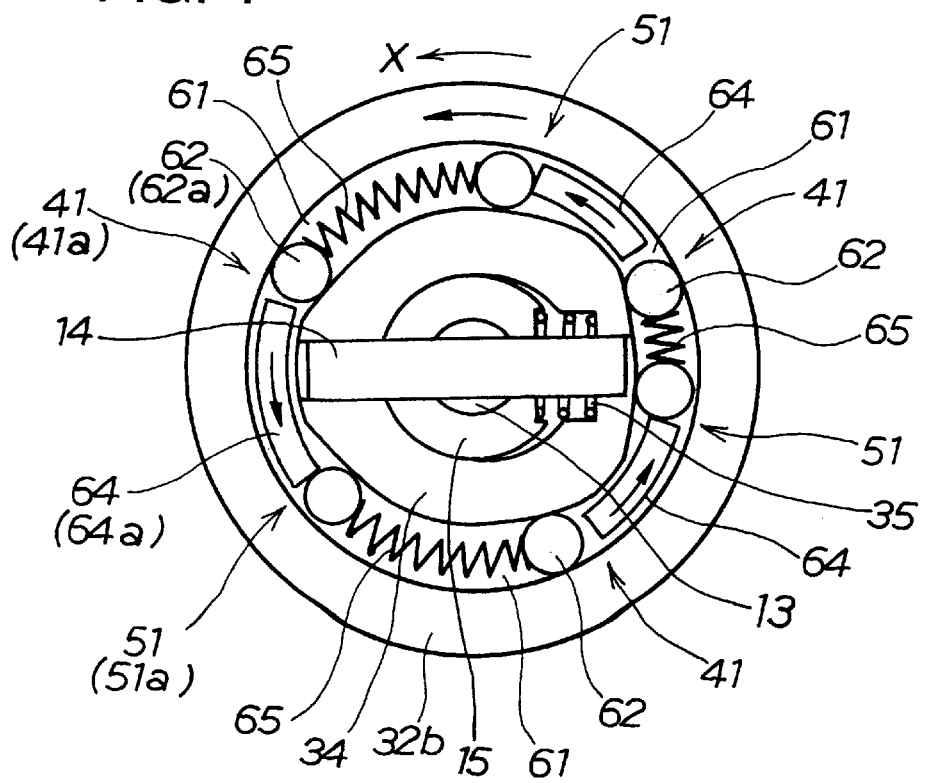
Figure 8:
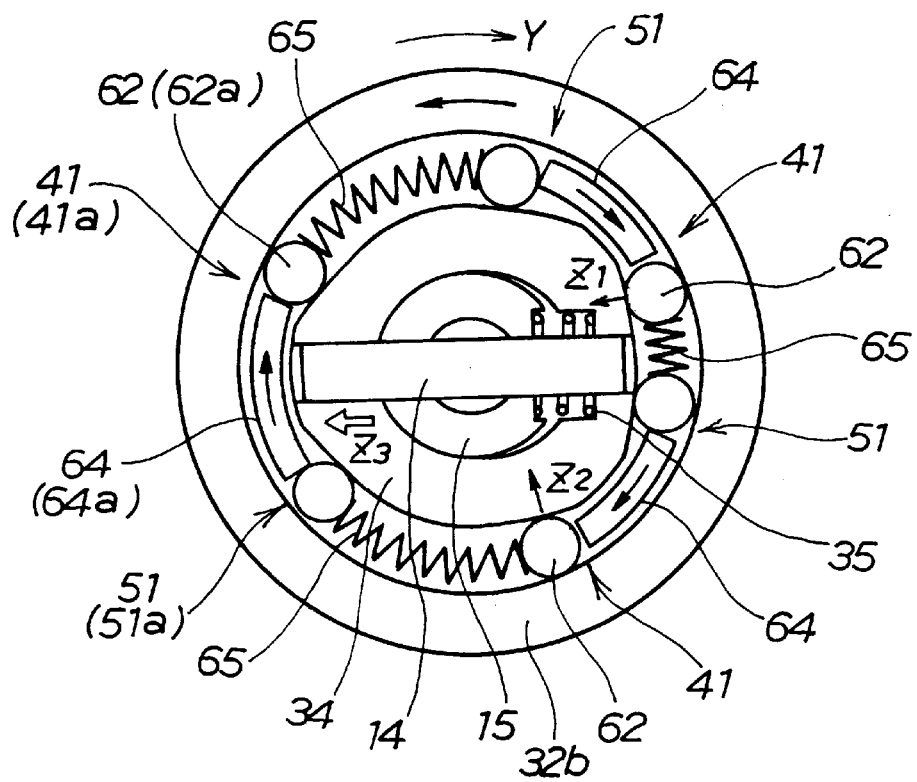

Alternatively, when the steering wheel 2 is steered in one direction (counterclockwise direction in FIG. 6, for example) with a great manual steering force (i.e., the steering torque on the steering wheel 2 is large), the electric motor 5 generates an auxiliary torque. Under such condition, the relative position or phase between the position control members 64 and the output member 34 changes greatly. In this instance, as shown in FIG. 7, the position control members 64 are greatly displaced in the counterclockwise direction indicated by the arrow X. With this angular displacement of the position control members 64, the locking members 62 of the first clutch mechanisms 41 are displaced by the force of the urging members 65 toward the tapering circumferential ends of the corresponding tapering spaces 61 with the result that the input member 32b and the output member 34 are brought into the engaged condition or state via frictional forces acting between the input member 32b and the locking members 62 and between the locking members 62 and the output member 34. Thus, all of the first clutch mechanisms 41 are now in the engaged state.

In this instance, since the electric motor 5 is rotating, the input member 32b is rotated in the direction indicated by the arrow X. Thus, the auxiliary torque generated from electric motor 5 is transmitted from the input member 32b to the output member 34 via the first clutch mechanisms 41. The output member 34 is rotated in the direction indicated by the arrow X in FIG. 7 to drive the output shaft 15 by a rotational force or torque which is a combination of the steering torque in the steering system (input shaft 11→torsion bar 13→output shaft 15) and the auxiliary torque from the electric motor 5.

Thereafter, when the first clutch mechanisms 41 are to be disengaged due to some reasons while transmission of the auxiliary torque from the electric motor 5 is still continuing, the electric power steering device will operate as follows.

Figure 9:
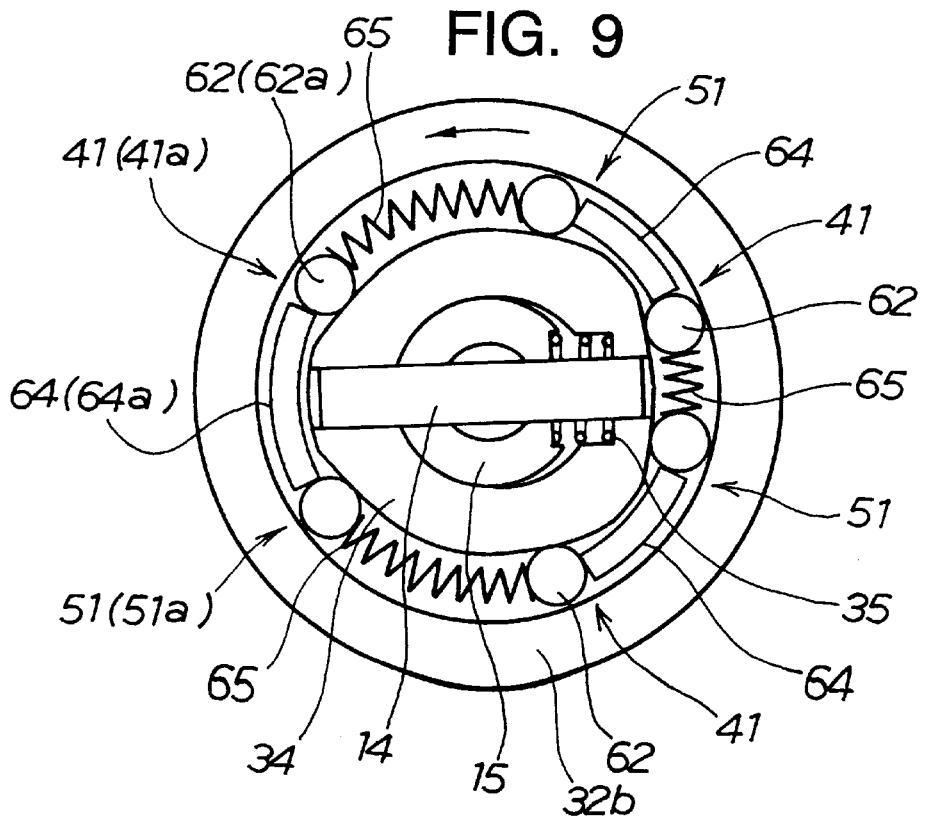

The steering wheel 2 (FIG. 1) is steered or turned in the opposite direction whereupon, as shown in FIG. 9, the position control members 64 angularly move or turn in a direction (indicated by the arrow Y) opposite to the rotating direction of the input member 34b. During that time, the selected position control member 64a comes into contact with the right-hand adjacent locking member (designated by 62a for expediency), in advance to the engagement between the other two or remaining position control members 64, 64 and the corresponding right-hand adjacent locking members 62, 62 and, subsequently, it forces the locking member 62a in the direction of the arrow Y against the force of the urging member 65 and a frictional force acting between the input member 32b and the output member 34.

With this displacement of the locking member 62a, the selected first clutch mechanism 41 is disengaged. In this instance, however, since the remaining position control members 64, 64 are still distant from the right-hand adjacent locking members 62, 62, two vectors $Z_1$, $Z_2$ continuously acts from the other two or remaining locking members 62, 62 to the output member 34, as indicated by the arrows in FIG. 8. Consequently, the output member 34 is subjected to an unbalanced load indicated by the arrow $Z_3$, resulting from the resultant vector or force of the two vectors $Z_1$, $Z_2$. By the effect of this unbalanced load, the output member 34 while being guided along the pin 14 is slightly displaced toward the selected position control member 64a against the force of the resilient member 35. With this displacement of the output member 34, the tapering spaces 61 receiving therein the remaining locking members 62 are slightly spread or enlarged with the result that the wedging force of the remaining locking members 62 acting on the input and output members 32b, 34 is reduced.

Immediately thereafter, the remaining position control members 64, 64 come into contact with the remaining locking members 62, respectively, and then force them to return to the original neutral position, as shown in FIG. 9. The other two or remaining first clutch mechanisms 41 are, therefore, disengaged. The output member 34 automatically returns to its original neutral position by the resilient force of the resilient member 35. In this instance, since the remaining locking members 62 are kept free from friction, a manual effort or force (clutch-disengaging force) required to displace these locking members 62 by the remaining position control members 64 can be reduced to a small level just enough to overcome the urging force of the urging members 65. Thus, even though the input member 32b is continuously rotating, a set of three first clutch mechanisms 41 can be disengaged smoothly and reliably by a small clutch-disengaging force not exceeding the force required to disengage only one (selected clutch mechanism 41a) of the three first clutch mechanisms 41.

The second clutch mechanisms 51 operate in the same manner as, but in the opposite direction to, the first clutch mechanisms 41. Accordingly, in response to rotation of the steering wheel 2 (FIG. 1), the second clutch mechanisms 51 can be also selectively engaged and disengaged in like manner as described above with reference to FIGS. 6 to 9.

Figure 10:
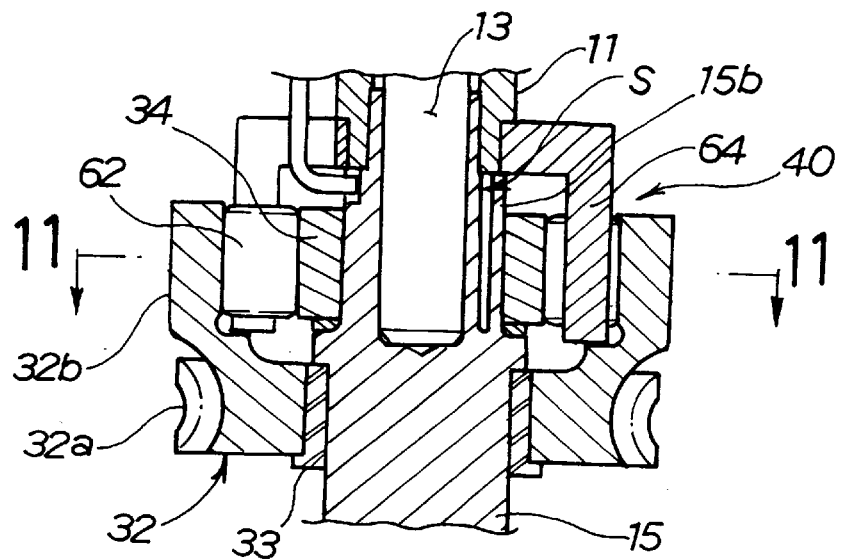
FIG. 10 is a longitudinal cross-sectional view of a mechanical clutch according to a second embodiment of the present invention.

FIGS. 10 through 15 show a second embodiment of the mechanical clutch 40 according to the present invention. FIG. 10 corresponds to FIG. 2 of the first embodiment previously described. Therefore, the reference characters designating like or corresponding parts are the same as those shown in FIG. 2 and a further description of these parts can be omitted.

The mechanical clutch 40 in the second embodiment is characterized in that the output shaft 15 has an upper end portion (fore-end portion) split by an axial slit S so as to form a tongue-like resilient axial strip 15b serving as a resilient member corresponding in function to the compression coil spring 35 of the first embodiment. The resilient axial strip 15b acts between a body of the output shaft 15 and the output member 34 to urge them toward each other. The resilient force of the resilient axial strip 15b acts in a direction parallel to the direction of movement of the output member 34 relative to the input member 32b.

Figure 11:
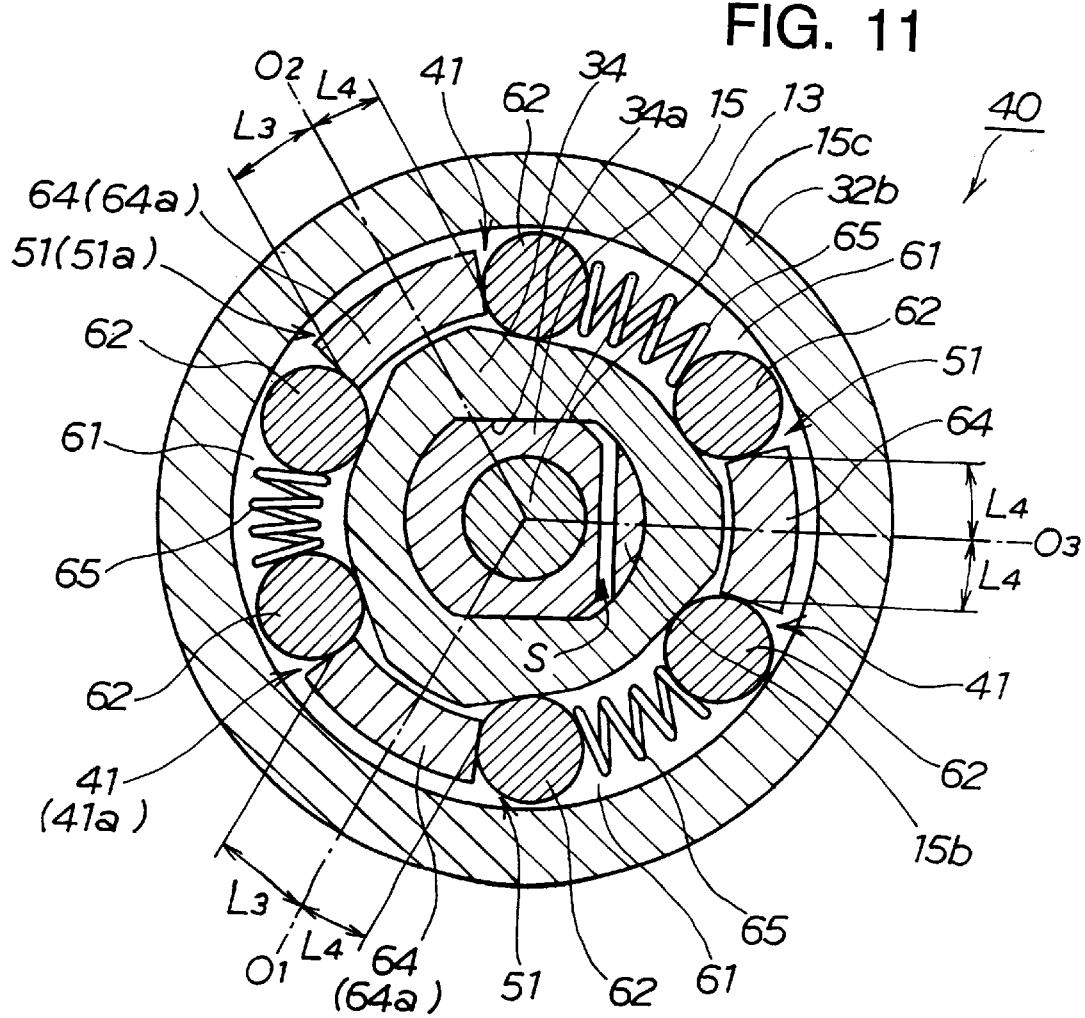
FIG. 11 is a cross-sectional view taken along line 11—11 of FIG. 10.

FIG. 11 is a cross-sectional view taken along line 11—11 of FIG. 10. As shown in this figure, the output member 34 is generally equilateral triangular shape in cross section having three corners truncated and three sides curved outwardly.

The slit upper end portion (fore-end portion) of the output shaft 15 is cutout or removed at diametrically opposite parts so as to form a pair of parallel flat surfaces 15c extending at right angles to the plane of the slit S. The output member 34 has a through-hole 34a complementary in contour to the shape of the slit upper end portion of the output shaft 15 including the flat surfaces 15c. The flat surfaces 15c serve to guide the output member 34 while the output member 34 is being displaced in a radial direction.

Three position control members 64 are disposed in the same circle and cirmumferentially spaced at regular intervals. Each of the position control members 64 has two tooth portions extending circumferentially in opposite directions from a longitudinal center line $O_1$–$O_3$ normally located in radial alignment with a corresponding one of the truncated corners of the generally equilateral triangular shape of the output member 34. One of the tooth portions which is located adjacent to a particular set 41a, 51a of the clutch mechanisms 41, 51 has a greater circumferential length than the other tooth portion ($L_3$>$L_4$). More specifically, two (selected position control members 64a, 64a) of the three position control members 64 have confronting tooth portions extending toward each other from the respective longitudinal center line $O_1$ and $O_2$, and these tooth portions (hereinafter referred to as "long tooth portion") are have a circumferential length $L_3$ greater than that $L_4$ of the other tooth portions (hereinafter referred to as "short tooth portion"). The long tooth portions position the locking members 62 of the selected first and second clutch mechanisms 41a, 51a. The tooth portions of the remaining position control member 64 have the same circumferential length which is equal to the circumferential length $L_4$ of the short tooth portions.

The output member 34 is displaceable toward a position located intermediately between the selected first clutch mechanism 41a and the selected second clutch mechanism 51a (or between the selected two position control members 64a, 64a) in a manner described below. To this end, the flat surfaces 15c of the output shaft 15 and the corresponding flat wall portions of the through-hole 34a extend parallel to the direction of displacement of the output member 34. The output shaft 15 is coupled by serration connection to a torsion bar 13.

The second embodiment of the foregoing construction is advantageous over the first embodiment shown in FIG. 5 in that the pin 14 and the resilient member 35 that are provided separately are no longer needed and, hence, the power steering device has a reduced number of components and can be assembled easily and less costly.

Operation of the mechanical clutch 40 of the second embodiment will be described in further detail with reference to FIGS. 1 and 12 through 15.

Figure 12:
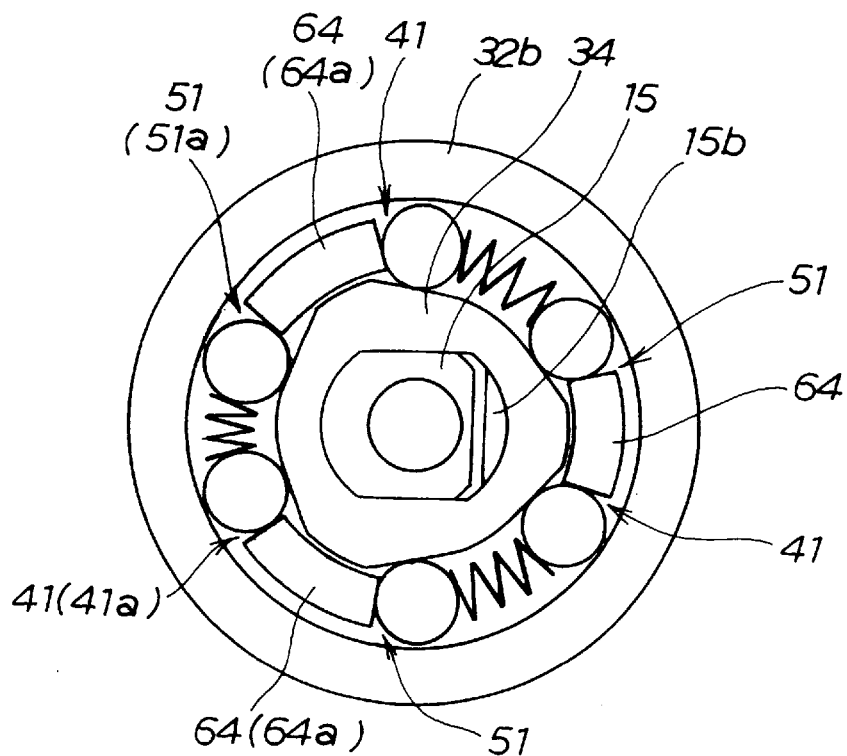
FIGS. 12 through 15 are diagrammatical views illustrative of the operation of the mechanical clutch according to the second embodiment.

When the steering wheel 2 (FIG. 1) is not actuated, all the first and second clutch mechanisms 41, 51 are in the disengaged state (neutral position), as shown in FIG. 12.

In cases where a steering torque exerted on the steering wheel 2 is small and the electric motor 5 (FIG. 1) generates no auxiliary torque, the relative position or phase between the position control members 64 and the output member 34 does not change to such an extent as to cause engagement of the first clutch mechanisms 41 or the second clutch mechanisms 51. Accordingly, the output member 34 is turned or rotated to drive the output shaft 15 by a steering torque in the steering system shown in FIG. 2 (input shaft 11→torsion bar 13→output shaft 15) without being influenced by a friction between the locking members 62 and the input member 32b or an inertial force produced by the electric motor 5.

Figure 13:
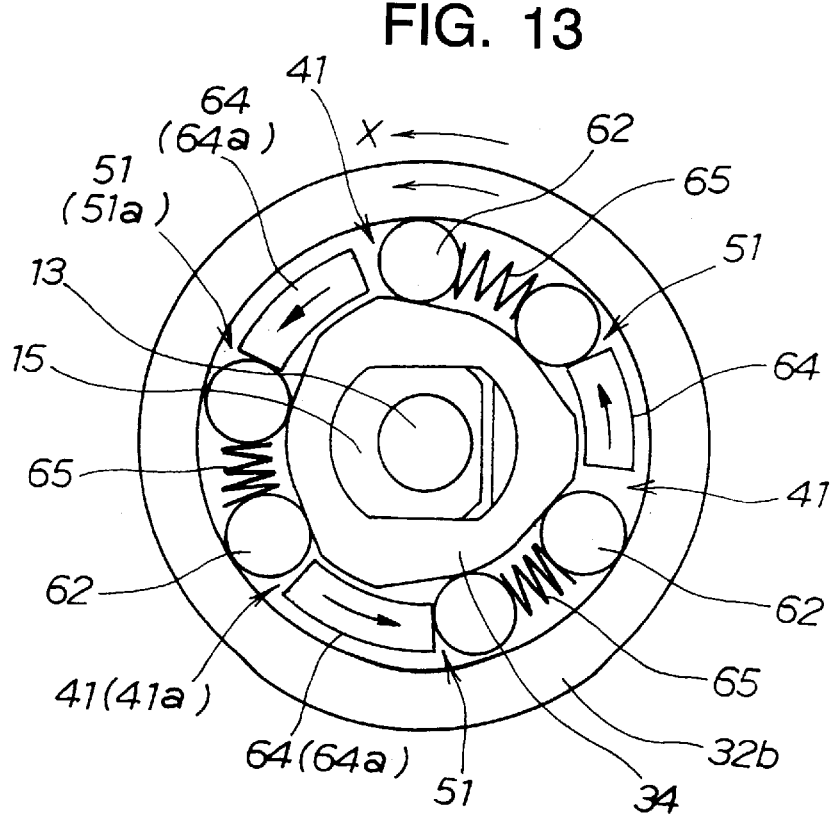

Alternatively, when a steering torque on the steering wheel 2 is large and the electric motor 5 is generating an auxiliary torque, the relative position or phase between the position control members 64 and the output member 34 changes greatly. For instance, as shown in FIG. 13, the position control members 64 are greatly displaced in the counterclockwise direction indicated by the arrow X. With this angular displacement of the position control members 64, the first clutch mechanisms 41 are brought to the engaged state. Thus, the output member 34 is rotated in the direction of the arrow X to drive the output shaft 15 by a combined torque which is the sum of the steering torque in the aforesaid steering system and the auxiliary torque from the electric motor 5.

Figure 14:
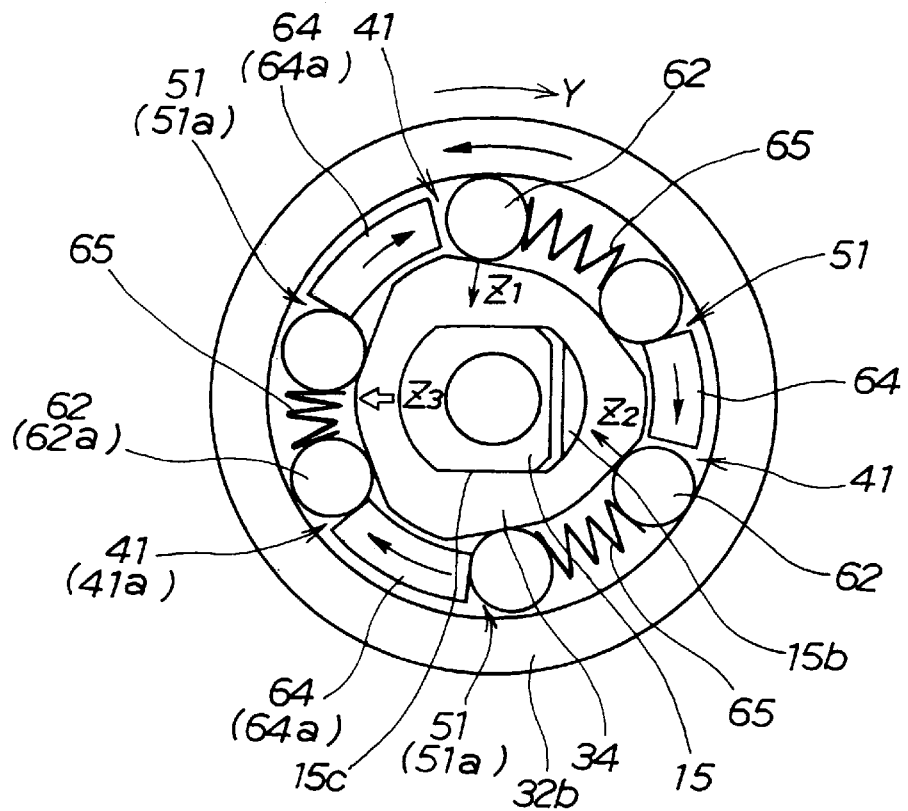

Thereafter, due to some reasons, the steering wheel 2 (FIG. 1) is turned in the opposite direction while transmission of the auxiliary torque from the electric motor 5 is still continuing. In this instance, the position control members 64 are turned in the direction of the arrow Y which is opposite to the direction of rotation of the input member 32b, as shown in FIG. 14. A selected one 64a of the position control members 64 comes into contact with the right-hand adjacent locking member 62a, in advance to the engagement between the other two or remaining position control members 64a, 64 and the corresponding righthand adjacent locking members 62, 62 and, subsequently, the selected position control member 64a forces the locking member 62a in the direction of the arrow Y to thereby disengage a selected one 41a of the first clutch mechanisms 41.

In this instance, since the remaining position control members 64a, 64 are still distant from the right-hand adjacent locking members 62, 62, there are two vectors $Z_1$, $Z_2$ acting from the other two or remaining locking members 62, 62 to the output member 34, as indicated by the arrows in FIG. 14. Consequently, the output member 34 is subjected to an unbalanced load indicated by the arrow $Z_3$ which results from the vectors $Z_1$, $Z_2$. By the effect of this unbalanced load, the output member 33 is slightly displaced in the direction of the arrow $Z_3$ against the resilient force of the resilient axial strip 15b while the output member 34 is being guided along the flat surfaces 15c of the output shaft 15. With this displacement of the output member 34, the tapering spaces 61 (FIG. 11) receiving therein the remaining locking members 62 are slightly spread or widened, and so the wedging force of the remaining locking members 62 acting on the input and output members 32b, 34 is reduced.

Figure 15:
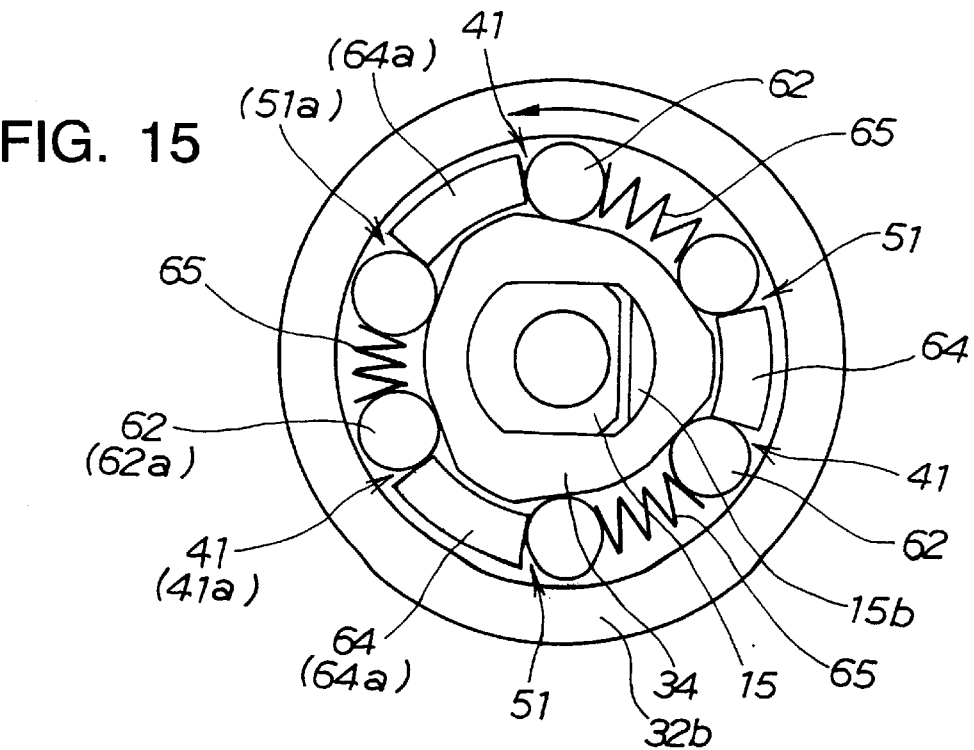

Immediately thereafter, the remaining position control members 64a, 64 come into contact with the remaining locking members 62, respectively, and then force them in the direction of the arrow Y to thereby disengage the other two or remaining first clutch mechanisms 41, as shown in FIG. 15. The output member 34 automatically returns to its original neutral position by the resilient force of the resilient axial strip 15b.

Thus, even though the input member 32b is continuously rotating, all the three first clutch mechanisms 41 can be disengaged smoothly and reliably by only a small clutch-disengaging force not exceeding the force required to disengage only one (selected clutch mechanism 41a) of the first clutch mechanisms 41.

The second clutch mechanisms 51 operate in the same manner as, but in the opposite direction to, the first clutch mechanisms 41 described above. Accordingly, in response to rotation of the steering wheel 2 (FIG. 1), the second clutch mechanisms 51 can be also selectively engaged and disengaged in like manner as described above with reference to FIGS. 12 to 15.

Figure 16:
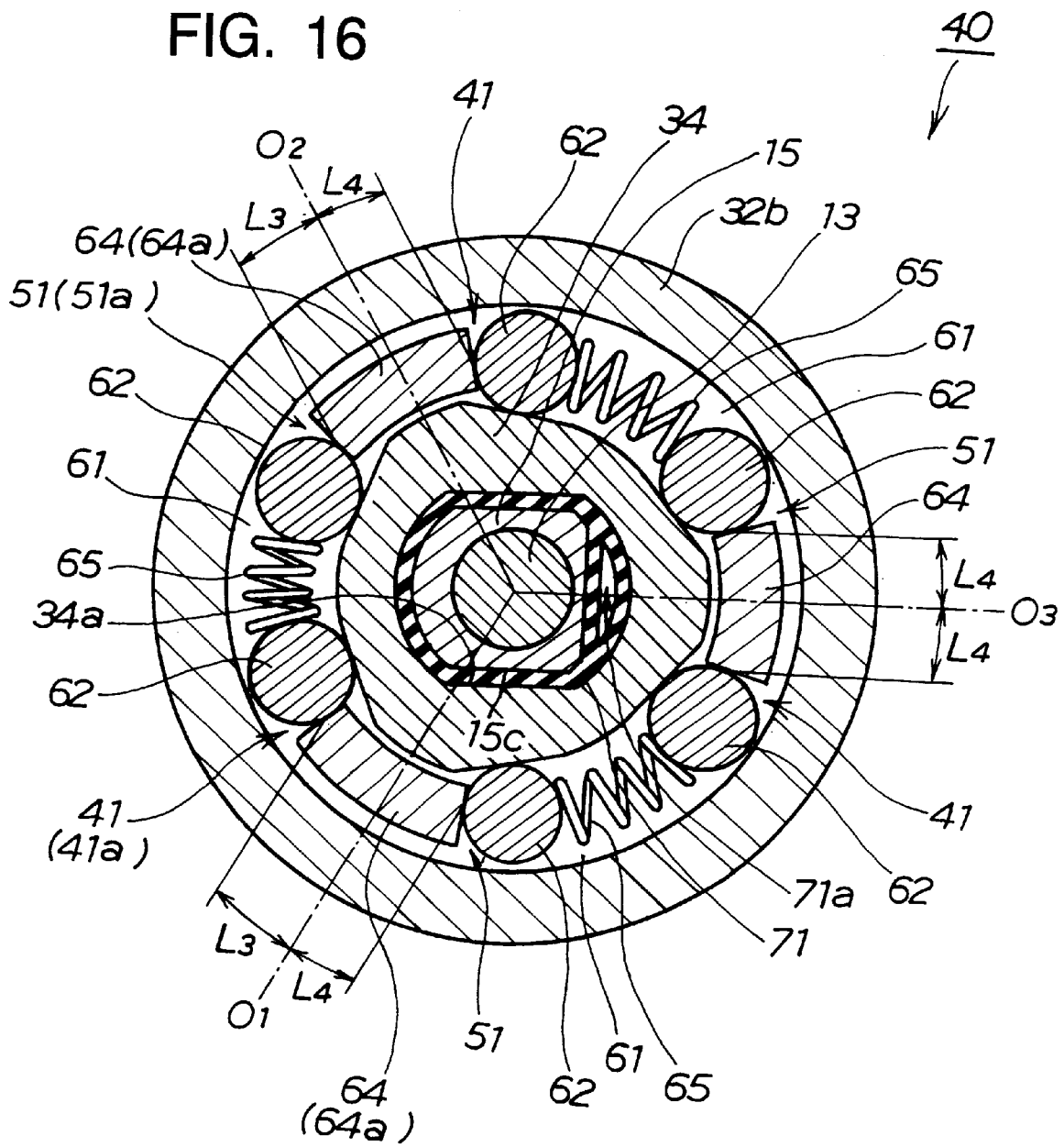
FIG. 16 is a cross-sectional view of a mechanical clutch according to a third embodiment of the present invention.

FIG. 16 shows a mechanical clutch 40 according to a third embodiment of the present invention. In FIG. 16 these parts which are like or corresponding to those used in the second embodiments parts are designated by the same reference characters, and a further description of these parts can be omitted.

The mechanical clutch 40 shown in FIG. 16 is a modification of the mechanical clutch of the second embodiment shown in FIG. 11. The modified mechanical clutch 40 is characterized in that the output member 34 is held on the output shaft 15 via an elastic member 71 made of a material having a damping or shock-absorbing property, such as rubber.

More particularly, the elastic member 71 is disposed between the outside surface of a non-circular upper end portion of the output shaft 15 including flat surfaces 15c, and the inside surface of an oblong through-hole 34a in the output member 34. The elastic member 71 includes a hollow resilient portion 71a having the same function as the compression coil spring 35 shown in FIG. 5 and the tongue-like resilient axial portion 15b shown in FIG. 11. The hollow resilient portion 71a acts between the output shaft 15 and the output member 34 to urge them toward each other by a resilient force acting in a direction parallel to the direction of movement of the output member 34 relative to the input member 32b.

The third embodiment of the foregoing construction is advantageous in that operation noises (striking noises, in particular) of the mechanical clutch 40 can be dampened or attenuated by the elastic member 71.

Operation of the mechanical clutch 40 is the same as that of the second embodiment shown in FIGS. 12 to 15 and, hence, requires no further description thereof.

Figure 17:
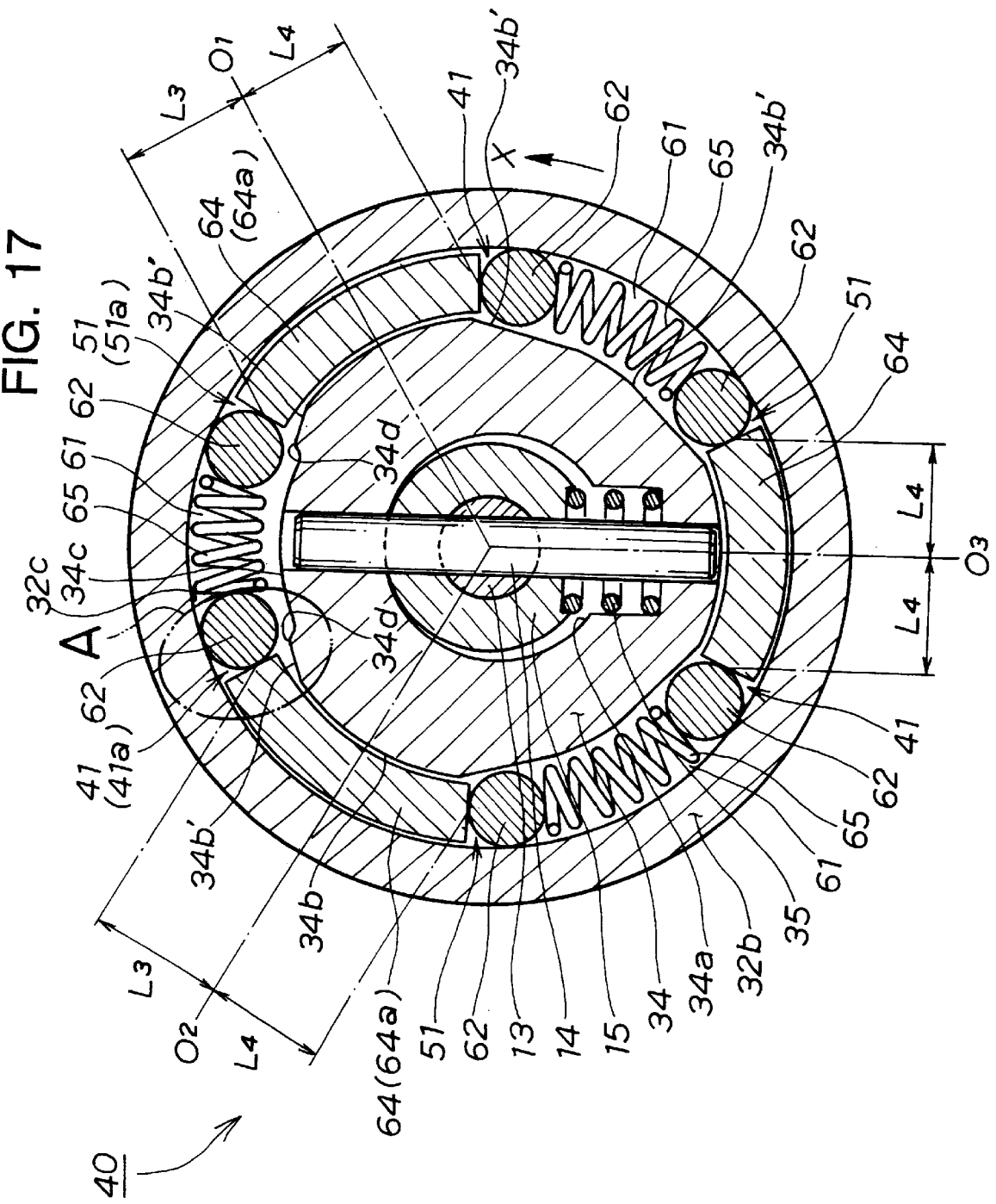
FIG. 17 is a cross-sectional view of a mechanical clutch according to a fourth embodiment of the present invention.

FIG. 17 shows a mechanical clutch according to the fourth embodiment of the present invention, the mechanical clutch 40 being a variation of the mechanical clutch of the second embodiment shown in FIG. 11. In FIG. 17 these parts which are like or correspond to those used in the second embodiment shown in FIG. 11 are designated by the same reference characters, and no further description of these parts is needed.

The mechanical clutch 40 includes an output member 34 having a generally equilateral triangular shape in cross section with three corners truncated or rounded and with three sides curved outwardly. The output member 34 is mounted such that it is displaceable in a radial direction relative to the input member 32a by virtue of a structure detailed above with reference to the first embodiment shown in FIG. 5.

A selected one 41a of three first clutch mechanisms 41 and a corresponding one 51a of three second clutch mechanisms 51 each form a particular clutch which is capable of engaging and disengaging in advance to the engagement and disengagement of the remaining clutch mechanisms 41, 51.

Stated more specifically, three position control members 64 are disposed in the same circle and cirmumferentially spaced at regular intervals. Each of the position control members 64 has two tooth portions extending circumferentially in opposite directions from a longitudinal center line $O_1$–$O_3$ normally located in radial alignment with a corresponding one of the truncated corners of the generally equilateral triangular shape of the output member 34. One of the tooth portions which is located adjacent to the selected first clutch mechanism 41a or the selected second clutch mechanism 51a has a greater circumferential length than the other tooth portion ($L_3$>$L_4$). Especially, two (selected position control members 64a, 64a) of the position control members 64 have confronting tooth portions extending toward each other from the respective longitudinal center line $O_1$ and $O_2$, and these tooth portions (hereinafter referred to as "long tooth portion") are have a circumferential length $L_3$ greater than that $L_4$ of the other tooth portions (hereinafter referred to as "short tooth portion"). The long tooth portions have a function to position the locking members 62 of the selected first and second clutch mechanisms 41a, 51a. The tooth portions of the remaining position control member 64 have the same circumferential length which is equal to the circumferential length $L_4$ of the short tooth portions.

A selected one pair of first and second clutch mechanisms 41a, 51a has a pair of tapering spaces 61, respectively, each tapering spaces 61 being partly enlarged to allow the locking member 62 to separate or disengage from the frictional engagement surfaces.

More specifically, the polygonal outside surface 34b of the output member 34 has a pair of recesses 34c formed in adjacent two of the frictional engagement surface portions (output side engagement surfaces) 34b' for allowing the locking members 62 of the selected first and second clutch mechanisms 41a, 51a to disengage from the frictional engagement surfaces 32c, 34b'.

In addition, these output side engagement surfaces 34b' of the output member 34 which are adapted to engage the locking members 62 of the other clutch mechanisms 41, 51 have a release angle (tapering in a direction opposite to the direction of movement of the output member 34). With the output side engagement surfaces 34b' thus profiled, when the selected clutch mechanism 41a or 51a is disengaged, the output member 34 can be smoothly displaced in the radial direction without being subjected to any resistance from the locking members 62. This will ensure subsequent reliable disengagement of the other two or remaining clutch mechanisms 41 or 51.

Figure 18:
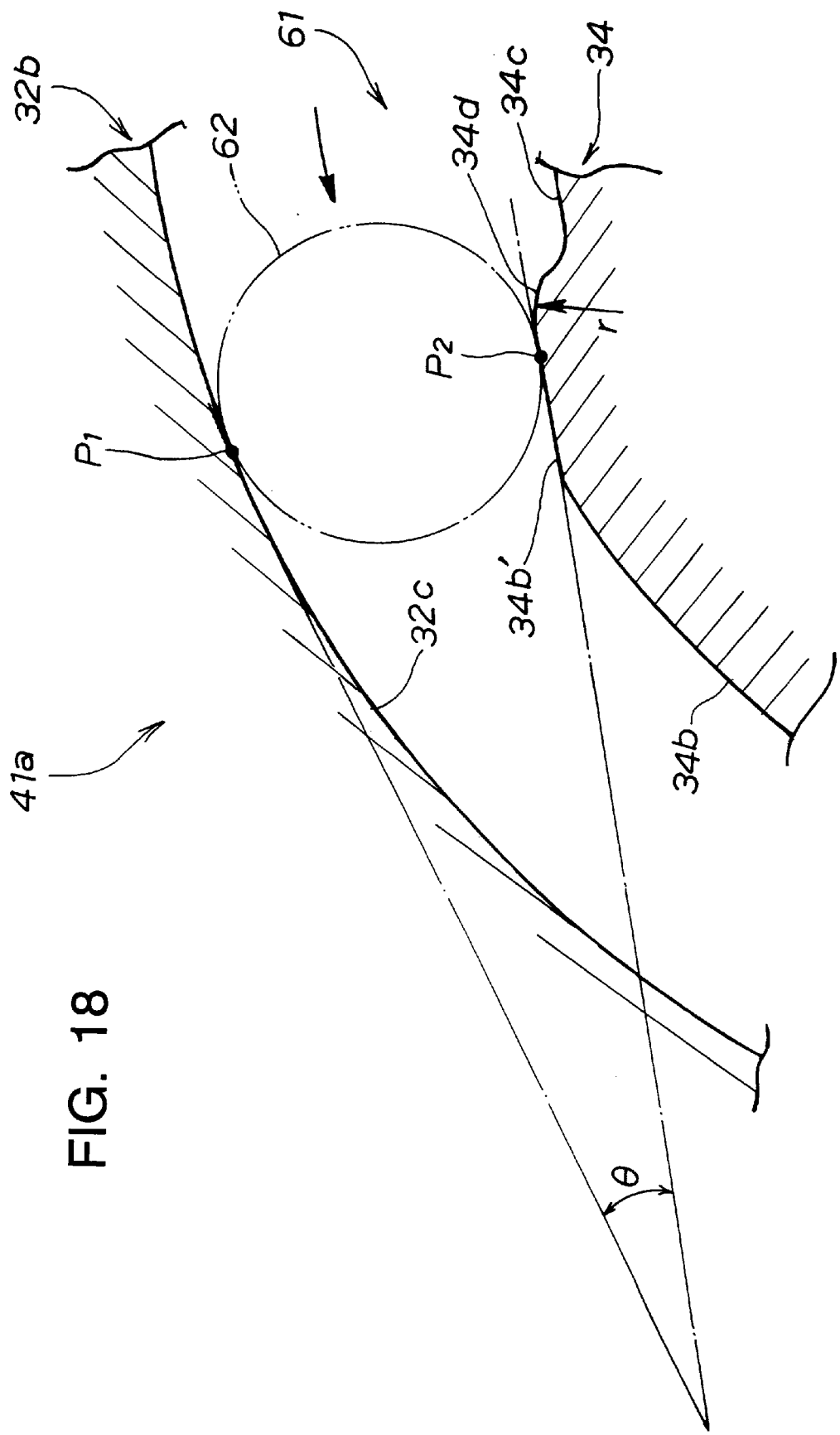
FIG. 18 is a detailed view of a portion A shown in FIG. 17.

FIG. 18 is a detailed view of a portion indicated by A shown in FIG. 17, showing the frictional engagement surfaces of the tapering space 61 of the selected first clutch mechanism 41a.

As described previously, the friction engagement surfaces include the cylindrical inside surface (input side engagement surface) 32c of the input member 32b and engagement surface portions (output side engagement surfaces) 34b' of the polygonal outside surface 34b of the output member 34.

When the output member 34 is concentric with the input member 32b, the locking member 62 is engaged with the input and output side engagement surfaces 32c, 34b', as indicated by the phantom line shown in FIG. 18. In this condition, the locking member 62 has two contact points $P_1$ and $P_2$, one $P_1$ between itself and the input side engagement surface 32c and the other $P_2$ between itself and the output side engagement surface 34b'.

As described above, the output member 34 is movable in the radial direction relative to the input member 32b. With this relative movement between the input and output members 32b, 34, the position of the locking member 62 in the tapering space 61 is changed. To deal with this positional change or displacement of the locking member 62, at least one of the input and output side engagement surfaces 32c, 34b' has a taper angle correcting portion 34d. The taper angle correcting portion 34d serves to maintain a wedge angle θ of the locking member 62 (at the contact points $P_1$, $P_2$) substantially constant even when the position of the locking member 62 is changed.

In the illustrated embodiment, the taper angle correcting portion 34d is a sloped surface formed by cutting out a portion of the substantially flat output side engagement surface 34b' in such a direction as to enlarge or spread the taper angle of the tapering space 61 (i.e., the right-hand direction in FIG. 18). The sloped surface 34d is preferably an arcuate surface having a radius r. One end of the arcuate surface 34d merging with the flat engagement surface 34b is slightly offset from the contact point $P_2$ in a direction opposite to the tapering direction of the tapering space 61. The arcuate surface (taper angle correcting portion) 34d is properly profiled such that the wedge angle e at contact points is maintained substantially constant even when the position of a center of the arcuate surface 34d and the radius of the locking member 62 are changed.

The selected second clutch mechanism 51a also has a similar taper angle correcting portion 34d (FIG. 17) at the output side engagement surfaces 34b'.

Operation of the taper angle correcting portion 34d will be described below with reference to FIGS. 19A to 19C. For purposes of illustration, description given below is directed only to the taper angle correcting portion 34d incorporated in the selected first clutch mechanism 41a.

Figure 19A:
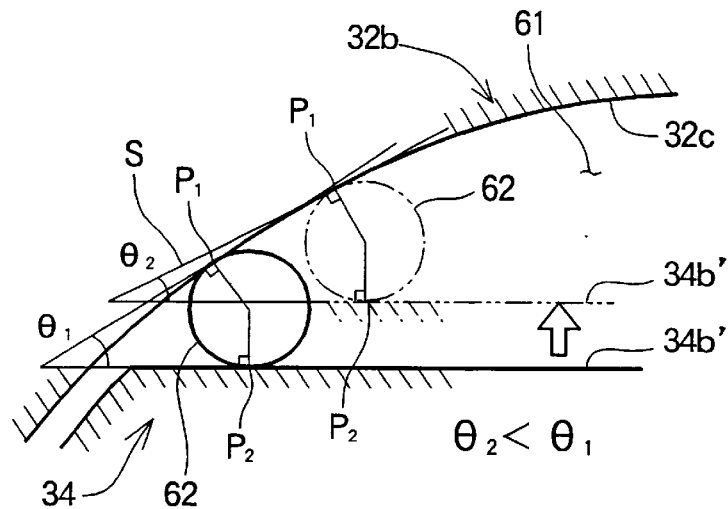
FIGS. 19A through 19C are diagrammatical views showing the operation of a taper angle correcting portion according to the present invention.

FIG. 19A diagrammatically shows a comparative example in which when the output member 34 is concentric with the input member 32b, a flat first surface (output side engagement surface) 34b' of the output member 34 is disposed in a lower level or position indicated by the thick solid line. In this condition, the locking member 62 has two contact points $P_1$, $P_2$, one $P_1$, between itself and the input side engagement surface 32c and the other $P_2$ between itself and the first surface 34b'. The wedge angle of the locking member 62 at the contact points $P_1$, $P_2$ is $\theta_1$.

When the output member 34 is displaced in a radial direction relative to the input member 32b, the first surface 34b' moves from the thick-solid-lined lower position to a phantom-lined upper position. With this upward movement of the first surface 34b', the locking member 62 is displaced in a direction opposite to the tapering direction of the tapering space 61 (i.e., the right-hand direction in FIG. 19a), causing the contact points $P_1$, $P_2$ to move in the same direction. A tangent line S touching the input side engagement surface 32c at the contact point $P_1$ has a smaller angle of inclination than as before, and so the locking member 62 has a smaller wedge angle $\theta_2$ at the contact points $P_1$, $P_2$. Since the locking member 62 having such a smaller wedge angle $\theta_2$ creates a greater wedging action or force, a greater clutch-disengaging force is required to disengage the locking member 62 from the input and output side engagement surfaces 32c, 34b'.

Figure 19B:
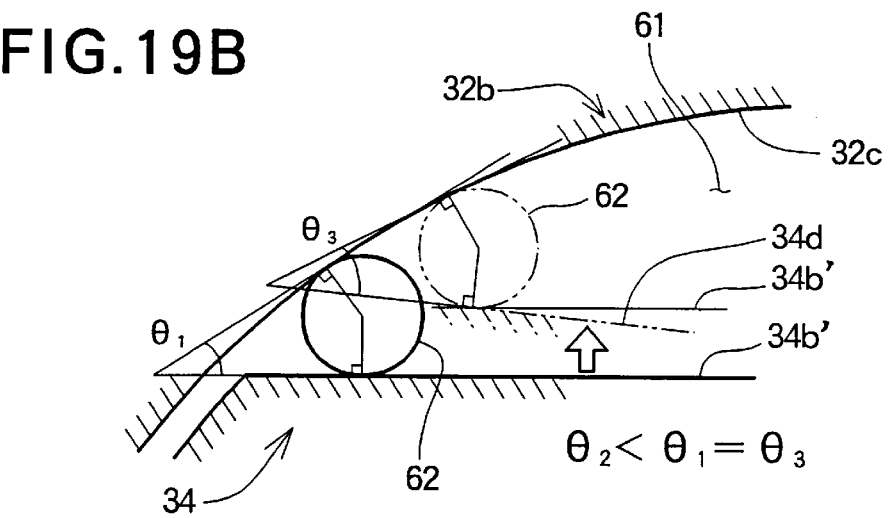

FIG. 19B illustrates the fundamental theory of the embodiment of the present invention which is able to overcome the foregoing drawback of the comparative example.

As shown in FIG. 19B, the phantom-lined, upwardly displaced first surface 34b' is combined with a second surface 34d which extends in such a direction (right-hand direction in this figure) as to spread or enlarge the taper angle of the tapering space 61. The second surface 34d is engageable with the upwardly displaced locking member 62, and when the locking member 62 is engaged with the input side engagement surface 32c and the second surface 34d, locking member 62 has a wedge angle $\theta_3$ which is substantially equal to the wedge angle $\theta_1$. Since the wedge angle of the locking member 62 is kept substantially constant even though the first surface 32' is displaced upwardly, the wedging action of the locking member 62 also remains unchanged. Accordingly, the locking member 62 can be disengaged from the input and output side engagement surfaces 32c, 32b' without requiring no additional force.

Figure 19C:
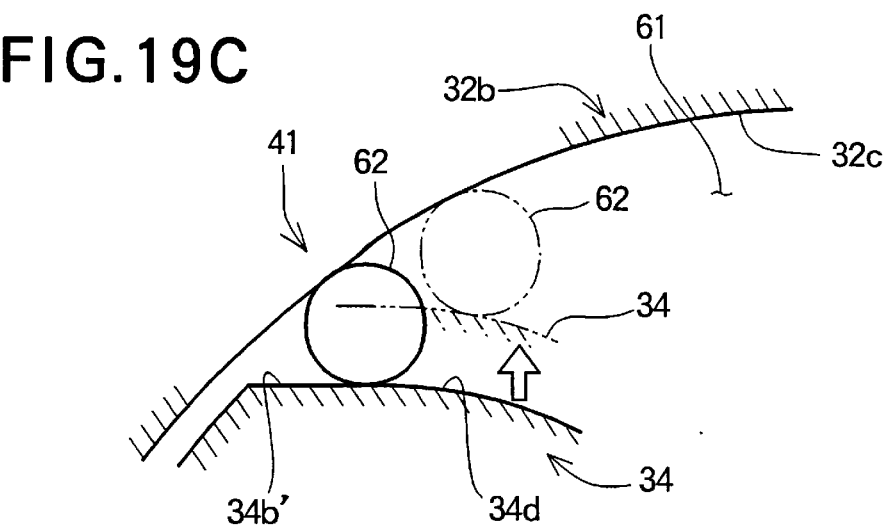
Figure 20:
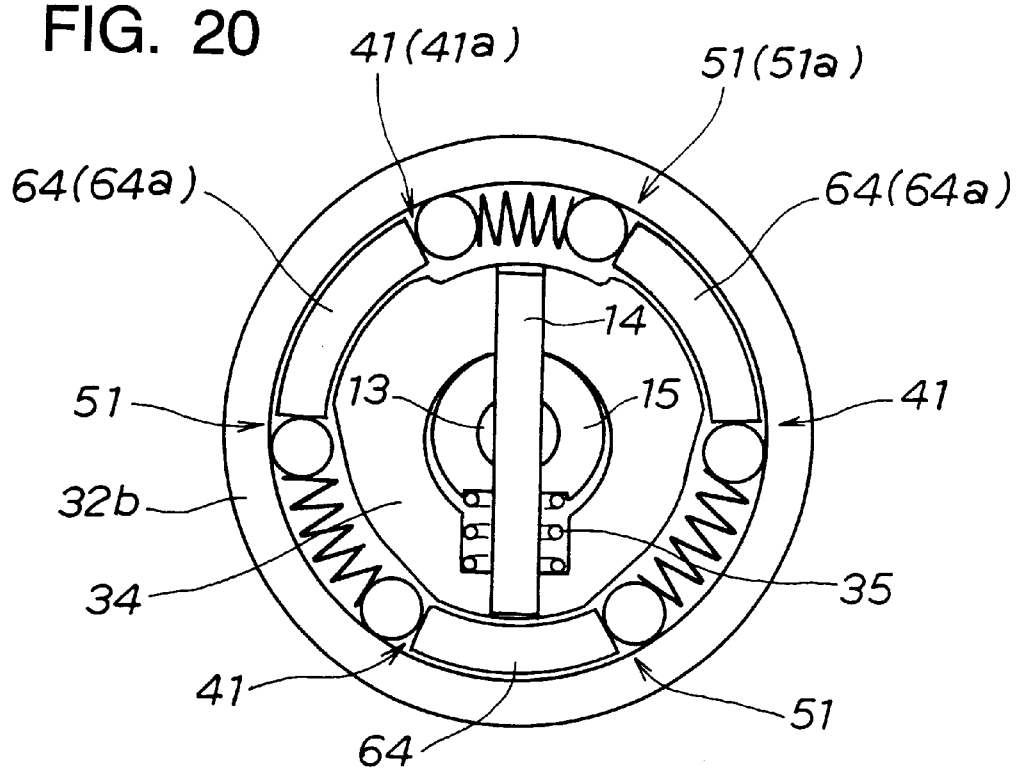
FIGS. 20 through 23 are diagrammatical views illustrative of the operation of the mechanical clutch shown in FIG. 17.

FIG. 19C shows a particular form of the structure used to implement the fundamental theory shown in FIG. 19B.

The generally flat, output side first surface 34b' is formed contiguously to a second surface 34d which is formed by an arcuate surface 34d sloping down in such a direction as to enlarge the taper angle of the tapering space 61.

When the output member 34 is displaced in a radial direction (upwards in FIG. 19C) relative to the input member 32b, as indicated by the phantom line, the locking member 62 received in the tapering space 61 is forced upwardly and rightwardly. In this instance, however, by virtue of the second surface 34d, the wedge angle of the locking member 62 (formed between a contact point between the locking member 62 and the input side engagement surface 32c, and a contact point between the locking member 62 and the output side engagement surface 32d) is maintained substantially constant, regardless of the displacement of the locking member 62. The arcuate surface (second surface) 34d has one end merging to the first surface 34b', the end being slightly offset from the contact point $P_2$ in a direction opposite to the tapering direction of the tapering space 61.

Thus, the wedge angle and the resulting wedging action of the locking member 62 are always kept constant regardless of the radial displacement of the output member 34 relative to the input member 32b, and so a force (clutch-disengaging force) required to disengage the locking member 62 from the input and output side engagement surfaces 32c, 34b' is also constant and no additional force is needed, accordingly.

The taper angle correcting portion 34d of the selected second clutch mechanism 51a operates in the same manner as described above, and no further description is needed.

Now, operation of the mechanical clutch 40 of the fourth embodiment will be described below with reference to FIGS. 1 and 20 through 23.

In FIG. 1, when the steering handle 2 is not actuated, no detection signal is produced from the steering torque detecting means 3. Accordingly, the control unit 4 does not output an assist instruction signal. In the absence of the assist instruction signal, the electric motor 5 is not energized and hence produces no auxiliary torque. In this condition, the first and second clutch mechanisms 41, 51 are all disposed in the disengaged state (neutral position).

In cases where a steering torque on the steering wheel 2 is small and the electric motor 5 generates no auxiliary torque, the relative position or phase between the position control members 64 connected to the input shaft 11 (FIG. 2) and the output member 34 changes slightly in one direction (counterclockwise direction, for example). However, the degree of the phase change is still insufficient to cause engagement of the first clutch mechanisms 41. Accordingly, the output member 34 is turned or rotated to drive the output shaft 15 by a steering torque in the steering system shown in FIG. 2 (input shaft 11→torsion bar 13→output shaft 15), without being influenced by a friction between the locking members 62 and the input member 32b or an inertial force produced by the electric motor 5.

Figure 21:
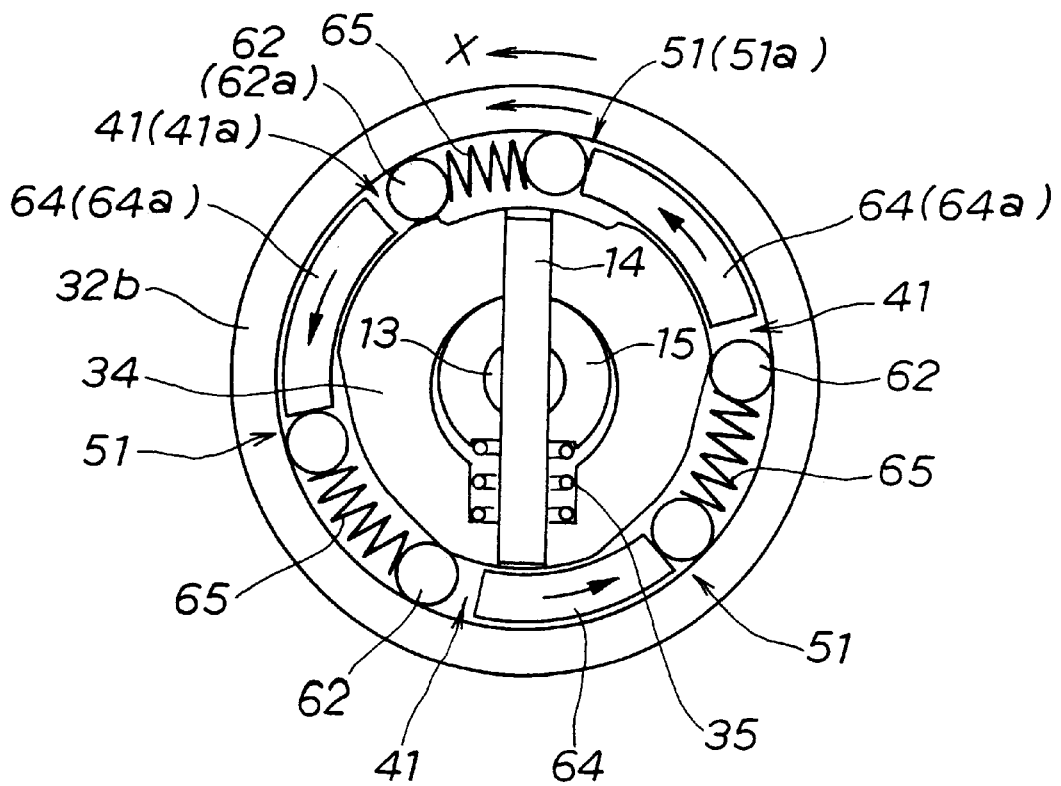

Alternatively, when a steering torque on the steering wheel 2 is large and the electric motor 5 is generating an auxiliary torque, the relative position or phase between the position control members 64 (including the selected position control members 64a) and the output member 34 changes greatly. For instance, as shown in FIG. 21, the position control members 64 are greatly displaced in the counterclockwise direction indicated by the arrow X. With this angular displacement of the position control members 64, the respective locking members 62 of the first clutch mechanisms 41 are displaced by the resilient force of the urging members 65 toward the tapering circumferential ends of the corresponding tapering spaces 61 and eventually wedge between the input member 32b and the output member 34, thereby engaging all the first clutch mechanisms 41.

In this instance, since the input member 32 is rotating in the direction of arrow X by rotation of the electric motor 5, an auxiliary torque produced by the electric motor 5 is transmitted from the input member 32b to the output member 34 via the first clutch mechanisms 41. Thus, the output member 34 is rotated in the direction of the arrow X to drive the output shaft 15 by a combined torque which is equal to the sum of the steering torque in the aforesaid steering system (input shaft 11→torsion bar 13→output shaft 15) and the auxiliary torque from the electric motor 5.

Thereafter, when the first clutch mechanisms 41 are to be disengaged due to some reasons while the transmission of the auxiliary torque from the electric motor 5 is continuing, the steering wheel 2 (FIG. 1) is turned in the opposite direction.

Figure 22:
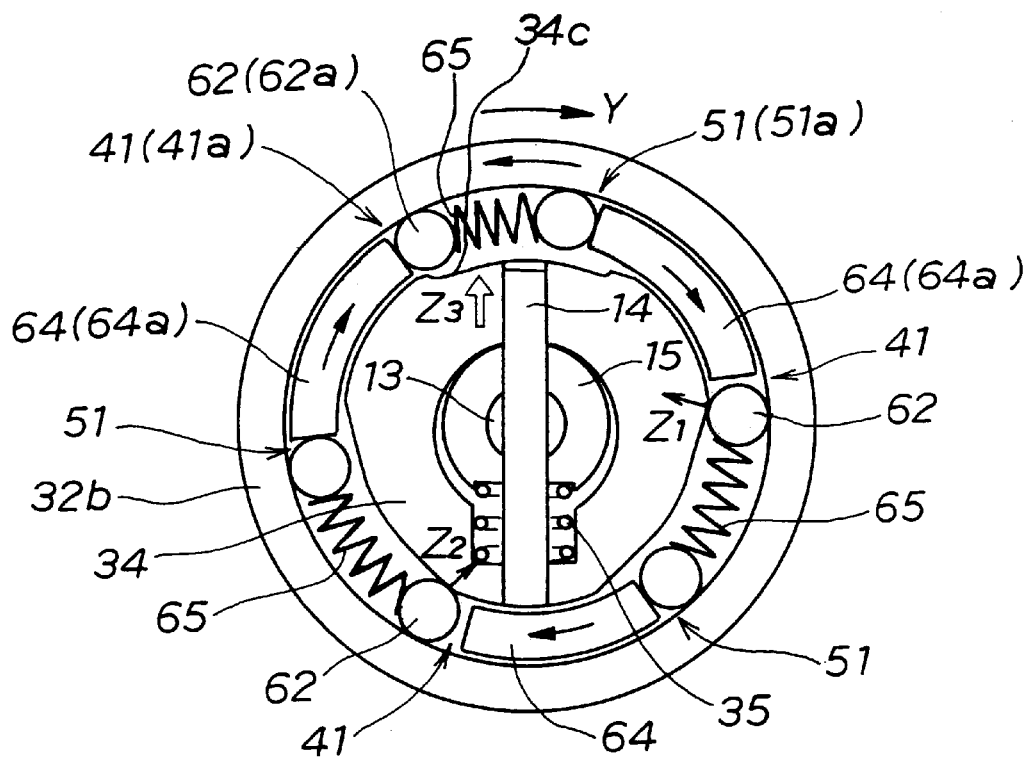

With this movement of the steering handle 2, the position control members 64 are tuned in the direction indicated by the arrow Y, as shown in FIG. 22, which is opposite to the rotating direction of the input member 32b. In this instance, one of the selected control members 64a(left one in this figure) comes into contact with the right-hand adjacent locking member 62 (hereinafter referred to as "selected locking member 62a") in advance to the engagement between the other two or remaining position control members 64a, 64 and the corresponding right-hand adjacent locking members 62, 62. Subsequently, the selected position control member 64a forces the selected locking member 62a in the direction of the arrow Y to thereby disengage a selected one 41aof the first clutch mechanisms 41.

In this instance, since the remaining position control members 64a, 64 are still distant from the right-hand adjacent locking members 62, 62, two vectors $Z_1$, $Z_2$ indicated by the arrows in FIG. 22 are acting from the other two or remaining locking members 62, 62 to the output member 34. Consequently, the output member 34 is subjected to an unbalanced load indicated by the arrow $Z_3$ which is a resultant vector or force of the two vectors $Z_1$, $Z_2$ By the effect of this unbalanced load, the output member 34 is slightly displaced in the direction of the arrow $Z_3$ against the resilient force of the resilient member 35 while it is guided along the pin 14. With this displacement of the output member 34, the tapering spaces 61 (FIG. 17) receiving therein the remaining locking members 62 are slightly spread or widened with the result that the wedging force of the remaining locking members 62 acting on the input and output members 32b, 34 is weakened or reduced.

Figure 23:
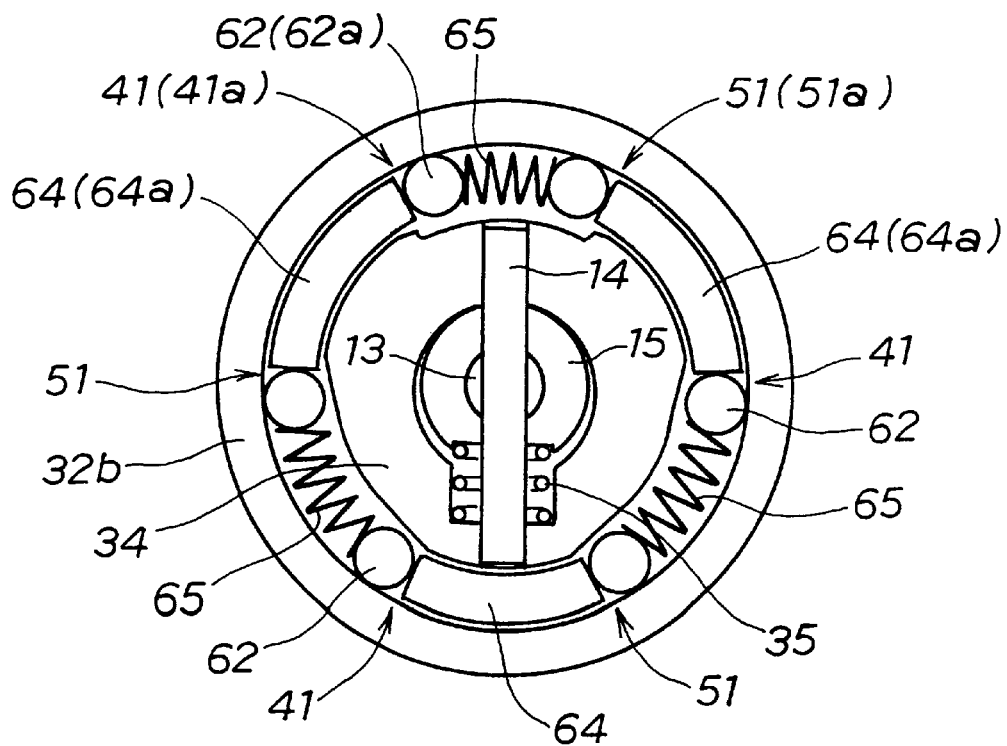

Immediately thereafter, the remaining position control members 64a, 64 come into contact with the remaining locking members 62, respectively, and then force them in the direction of the arrow Y to thereby disengage the other two or remaining first clutch mechanisms 41, as shown in FIG. 23. The output member 34 automatically returns to its original neutral position by the resilient force of the resilient member 35. Since the locking members 62 are kept free from friction, they can be disengaged from the input and output members 32b, 34 by only a small force just required to overcome the resilient force of the urging members 65. Thus, even though the input member 32b is continuously rotating, all the three first clutch mechanisms 41 can be disengaged with high reliability by only a small clutch-disengaging force not exceeding the force required to disengage only one (selected clutch mechanism 41a) of the first clutch mechanisms 41.

The second clutch mechanisms 51 operate in the same manner as, but in the opposite direction to, the first clutch mechanisms 41. Accordingly, in response to rotation of the steering wheel 2, the second clutch mechanisms 51 can be selectively engaged and disengaged in like manner as described above with reference to FIGS. 20 to 23.

Turning now to FIGS. 24 to 29, a fifth embodiment of the present invention will be described. These parts which are like or corresponding to those used in the fourth embodiment are designated by the same reference characters, and a further description thereof can be omitted.

Figure 24:
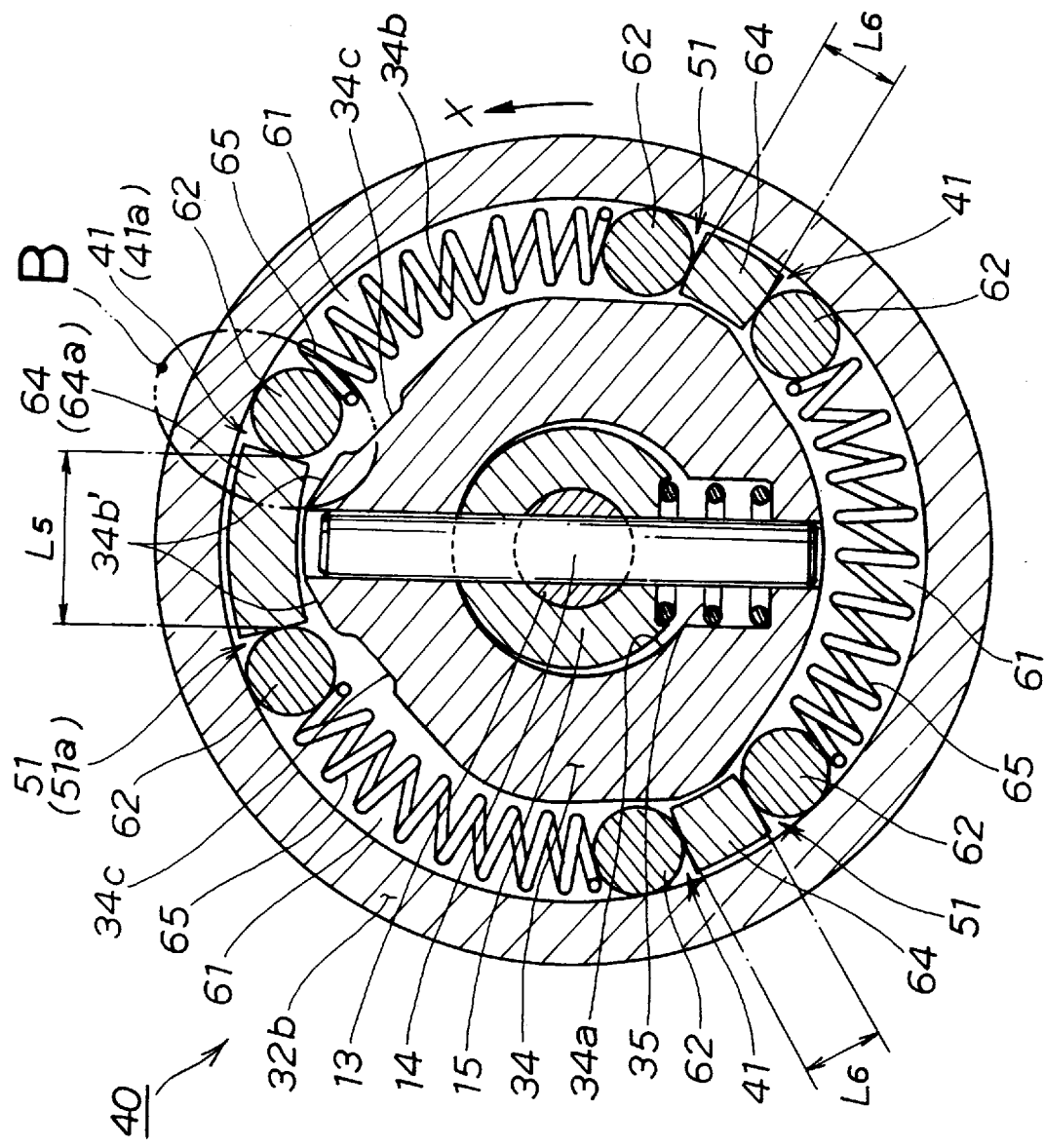
FIG. 24 is a cross-sectional view showing a mechanical clutch according to a fifth embodiment of the present invention.

FIG. 24 shows a cross section of a mechanical clutch according to the fifth embodiment, the mechanical clutch 40 being a variation of the mechanical clutch of the second embodiment shown in FIG. 17.

The mechanical clutch 40 includes an output member 34 having a generally equilateral triangular shape in cross section with three corners truncated or rounded and with three sides curved outwardly.

A selected one 64a of the three position control members 64 which is used to position a selected pair of first and second clutch mechanisms 41, 51 has a circumferential length $L_5$ greater than the circumferential length $L_6$ of the other two or remaining position control members 64, 64. The selected one position control member 64a is normally disposed in radial alignment with one of three truncated corners of the generally equilateral triangular shape of the output member 34. The remaining position control members 64, 64 are also normally disposed in radial alignment the other two or remaining truncated corners of the equilateral triangular shape of the output member 34.

The selected pair of first and second clutch mechanisms 41a, 51a has a pair of tapering spaces 61, respectively, each tapering spaces 61 being partly enlarged to allow the locking member 62 to separate or disengage from the frictional engagement surfaces 32c, 34b' when the selected first clutch mechanism 41a or the selected second clutch mechanism 51a is to be disengaged.

More specifically, the polygonal outside surface 34b of the output member 34 has a pair of recesses 34c formed in adjacent two of the frictional engagement surface portions (output side engagement surfaces) 34b' for allowing the locking members 62 of the selected first and second clutch mechanisms 41a, 51a to disengage from the frictional engagement surfaces 32c, 34b'.

Figure 25:
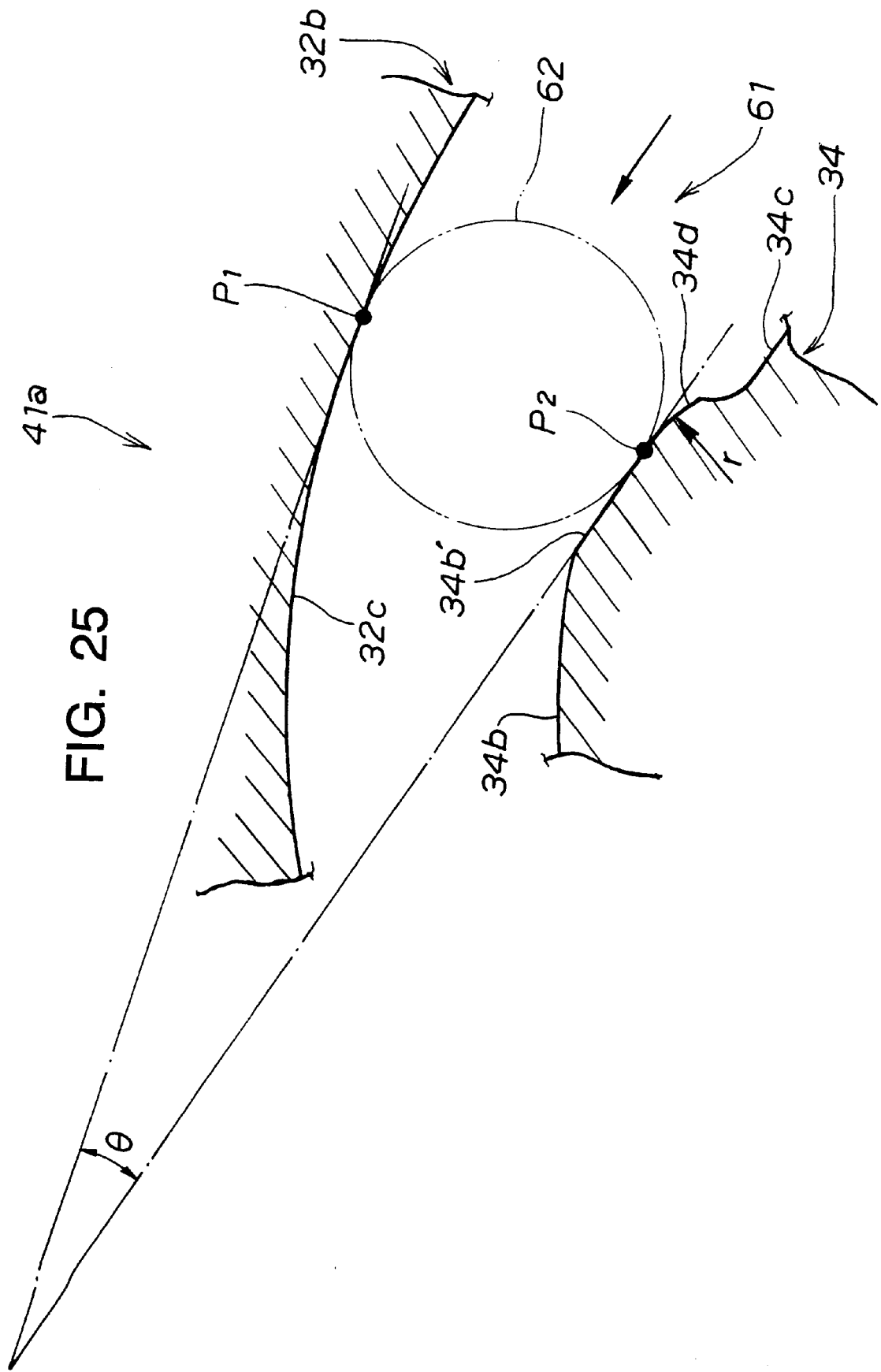
FIG. 25 is a detailed view of a portion B shown in FIG. 24.

FIG. 25 is a detailed view of a portion indicated by B shown in FIG. 24, showing the frictional engagement surfaces 32c, 34b' defining the tapering space 61 of the selected first clutch mechanism 41a.

In the illustrated embodiment, the friction engagement surfaces 32c, 34b' are structurally the same as those shown in FIG. 18. That is, the generally flat, output side engagement surface 34b' includes a sloped surface 34d sloping down in such a direction as to enlarge the taper angle of the tapering space 61. The sloped surface 34d is preferably an arcuate surface. The arcuate surface 34d is profiled such that the locking member 62 while being wedged between the frictional engagement surfaces 32c and 34b' always has the same wedge angle e even when the position of a center of the arcuate surface 34d or the radius of the locking member 62 is changed. The arcuate surface 34d serves as a taper angle correcting portion. The operation of the taper angle correcting portion 34d is the same as that of the fourth embodiment shown in FIG. 18, and a further description thereof can be omitted.

The selected second clutch mechanism 51a also has a similar taper angle correcting portion 34d (FIG. 24) at the output side engagement surfaces 34b'.

Now, the operation of the mechanical clutch 40 of the fifth embodiment will be described below with reference to FIGS. 1 and 26 through 29.

Figure 26:
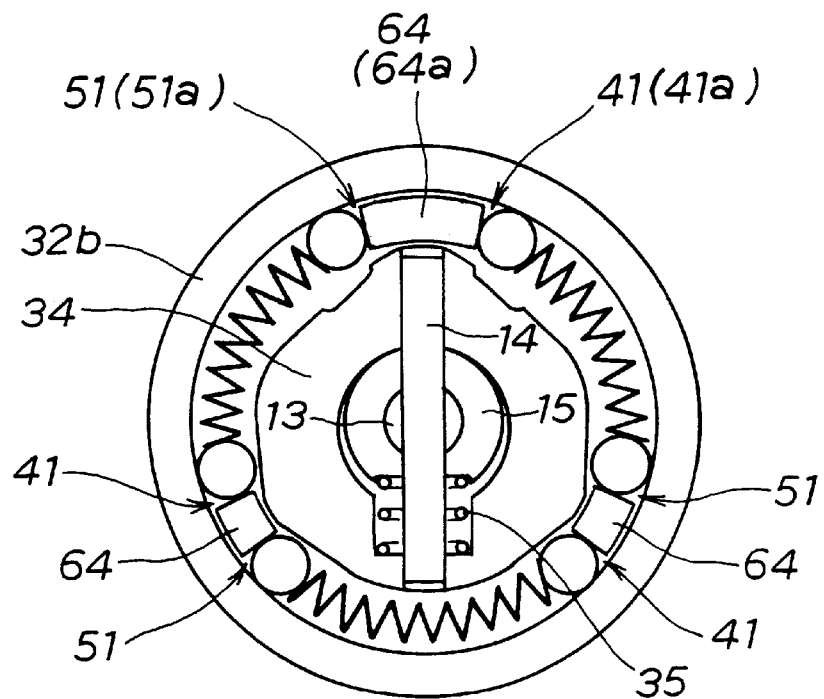
FIGS. 26 through 29 are diagrammatical views showing the operation of the mechanical clutch shown in FIG. 24.

When the steering handle 2 is not actuated, the first and second clutch mechanisms 41, 51 are all disposed in the disengaged state (neutral position), as shown in FIG. 26.

In cases where a steering torque on the steering wheel 2 is small and the electric motor 5 generates no auxiliary torque, the relative position or phase between the position control members 64 and the output member 34 does not show any substantial change and, hence, the first clutch mechanisms 41 is still held in the disengaged state. The output member 34 is turned or rotated to drive the output shaft by a steering torque in the steering system shown in FIG. 2, without being influenced by a friction between the locking members 62 and the input member 32b, and an inertial force produced by the electric motor 5.

Figure 27:
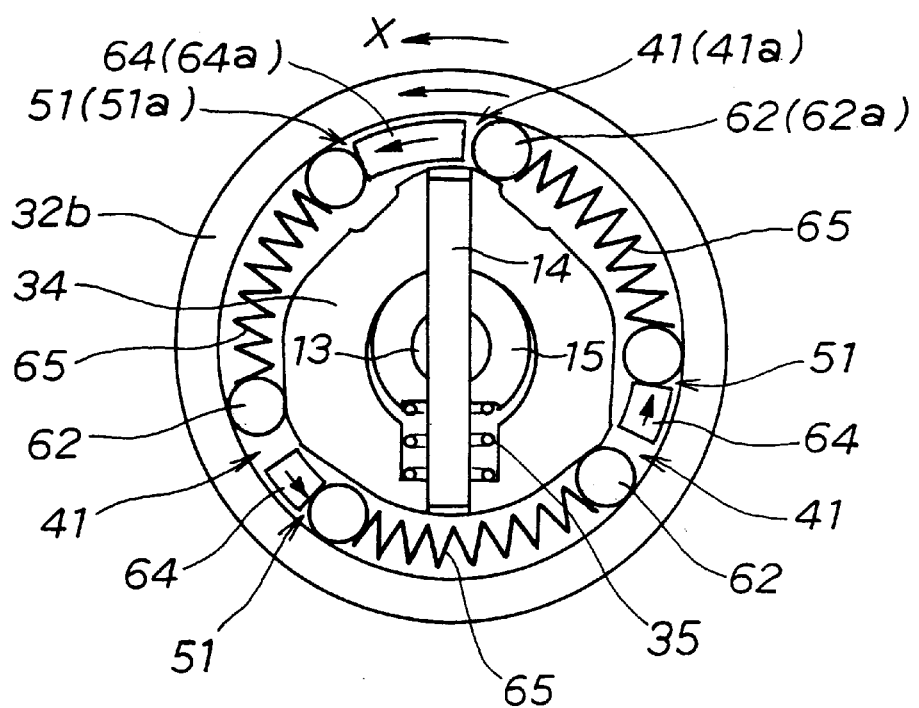

Alternatively, when a steering torque on the steering wheel 2 is large and the electric motor 5 is generating an auxiliary torque, the relative position or phase between the position control members 64 and the output member 34 changes greatly. For instance, as shown in FIG. 27, the position control members 64 are greatly displaced in the direction indicated by the arrow X. With this angular displacement of the position control members 64, the respective locking members 62 of the first clutch mechanisms 41 are displaced greatly in the direction of the arrow X to thereby bring the first clutch mechanisms 41 into the engaged state. In this instance, the output member 34 is rotated in the direction of the arrow X to drive the output shaft 15 by a combined torque which is the sum of the steering torque in the aforesaid steering system and the auxiliary torque from the electric motor 5.

Figure 28:
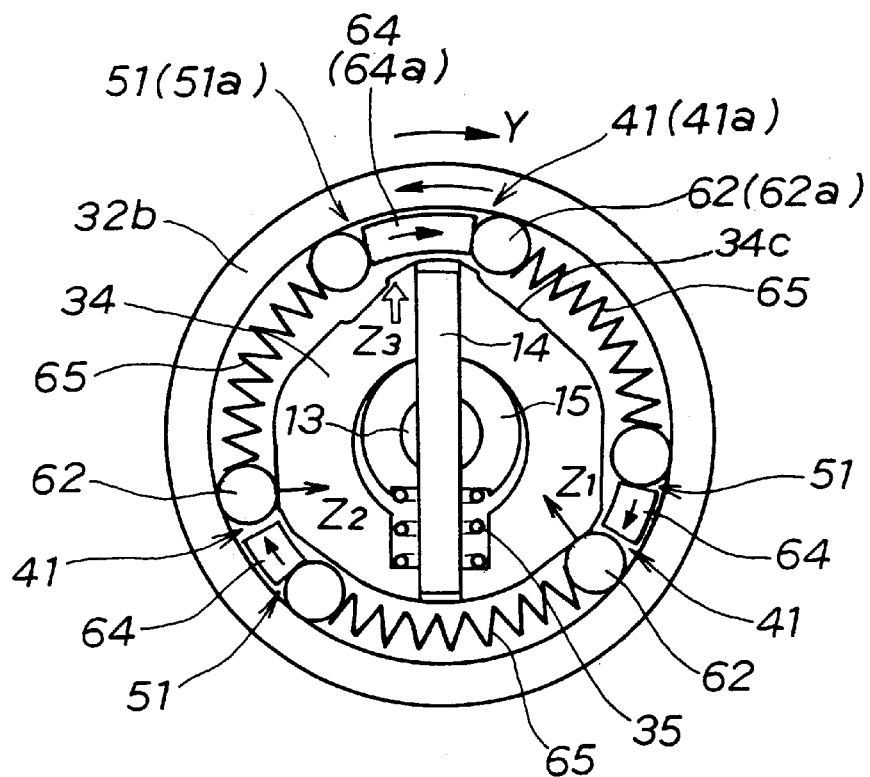

Thereafter, due to some reasons, the steering handle 2 is turned in the opposite direction while the transmission of the auxiliary torque from the electric motor 5 is continuing. With this movement of the steering handle 2, the position control members 64 are tuned in the direction indicated by the arrow Y which is opposite to the rotating direction of the input member 32b, as shown in FIG. 28. In this instance, the selected control member 64a comes into contact with the right-hand adjacent locking member 62a in advance to the engagement between the other two or remaining position control members 64, 64 and the corresponding right-hand adjacent locking members 62, 62. Subsequently, the selected position control member 64a forces the locking member 62a in the direction of the arrow Y to thereby disengage a selected one 41a of the first clutch mechanisms 41.

In this instance, the remaining position control members 64, 64 are still distant from the right-hand adjacent locking members 62, 62. Accordingly, there are two vectors $Z_1$, $Z_2$ acting from the locking members 62, 62 of the remaining first clutch mechanisms 41 to the output member 34, as indicated by the arrows in FIG. 28. Consequently, the output member 34 is subjected to an unbalanced load indicated by the arrow $Z_3$ which is a resultant vector or force of the two vectors $Z_1$, $Z_2$. By the effect of this unbalanced load, the output member 34 is slightly displaced in the direction of the arrow $Z_3$ against the resilient force of the resilient member 35 while it is guided along the pin 14. With this displacement of the output member 34, the tapering spaces 61 (FIG. 24) receiving therein the remaining locking members 62 are slightly spread or widened, so that the wedging force of the remaining locking members 62 acting on the input and output members 32b, 34 is reduced.

Figure 29:
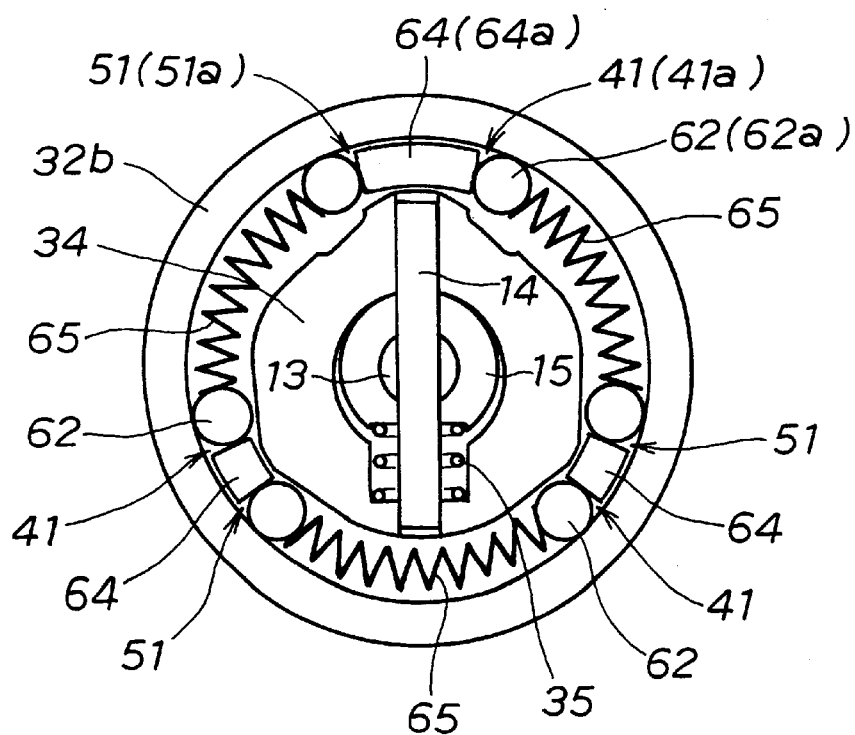

Immediately thereafter, the remaining position control members 64, 64 come into contact with the remaining locking members 62, respectively, and then force them in the direction of the arrow Y to thereby disengage the other two or remaining first clutch mechanisms 41, as shown in FIG. 29. The output member 34 automatically returns to its original neutral position by the resilient force of the resilient member 35.

Thus, even though the input member 32b is continuously rotating, all the three first clutch mechanisms 41 can be disengaged stably and reliably by only a small clutch-disengaging force not exceeding the force required to disengage only one (selected clutch mechanism 41a) of the first clutch mechanisms 41.

The second clutch mechanisms 51 operate in the same manner as, but in the opposite direction to, the first clutch mechanisms 41. Accordingly, in response to rotation of the steering wheel 2, the second clutch mechanisms 51 are selectively engaged and disengaged in like manner as described above with reference to FIGS. 26 to 29.

As shown in FIG. 28, owing to the provision of the recess 34c, the space between the outside surface 34b (FIGS. 24 and 25) of the output member 34 and the locking member 62b is enlarged to an extent equal to the depth of the recess 34c. This will insure a reliable separation or disengagement of the locking member 62a from the frictional engagement surfaces 32c, 34b' and makes it possible to increase the amount of displacement of the output member 34 in the radial direction relative to the input member 32. The first and second clutch mechanisms 41, 51 can, therefore, be disengaged rapidly and reliably.

The resilient member 13 should by no means be limited to the torsion bar shown in the illustrated embodiments but may include any other component provided that the component is able to create a relative torsional displacement between the input shaft 11 and the output shaft 15 which is proportional to the steering torque.

The number of the first clutch mechanisms 41 or the second clutch mechanisms 51 should by no means be limited to three in the illustrated embodiments but may be determined in option.

The output member 34 is mounted such that it is displaceable in a radial direction relative to the input member 32b. Alternatively, the input member 32b may be constructed as being displaceable in the radial direction relative to the output member 34.

The tapering spaces 61 are partly enlarged to facilitate separation or disengagement of the locking members 62 from the input and output side engagement surfaces 32c, 34b'. In place of the recess 34c form in the outside surface of the output member 34, the input member 32 may have a similar recess in its cylindrical inside surface.

The output member 34 which, when the locking member 62a of a selected clutch mechanism 41a, 51a is disengaged, is displaceable in the radial direction by a force exerted by the locking members 62 of the remaining clutch mechanisms 41, 51. The output member 34 has no limitation about the direction of displacement relative to the position of the position control members 64 because a frictional engagement force acting between the locking members 62 of the remaining clutch mechanisms and the output member 34 is reduced when the output member 34 is displaced in the radial direction by the force exerted by the same locking members 62.

The guide member used in combination with the output member 34 for guiding the latter is not limited to the pin 14 shown in the illustrated embodiments. Similarly, the resilient member used for urging the output member 34 against the output shaft 15 may include a compression coil spring 35, a tongue-like resilient axial strip 15b of the output shaft 15, a hollow resilient portion 71a of an elastic member 71, a belleville spring and the like.

The tapering spaces 61 should preferably be defined between the cylindrical inside surface 32c of the inside member 32 and the polygonal outside surface (including frictional engagement surface portions 34b') of the output member 34. The shape of the outside surface of the output member 34 is not limited to those shown in FIGS. 5, 11, 17 and 24. The input member 32b may have a polygonal inside surface in which instance the output member 34 preferably has a cylindrical outside surface.

The locking members 62 may be spherical other than cylindrical provided that they are selectively engageable and disengageable with the tapering circumferential ends of the mating tapering spaces 61 to engage and disengage the input member 32b and the output member 34.

The urging members incorporated in the mechanical clutch 40 should by no means be limited to the compression coil springs 65 but may include a rigid rubber member or a plate spring.

The first and second clutch mechanisms 41, 51 should preferably be composed of a frictional engagement clutch and hence may include a known sprag clutch described below.

The sprag clutch includes a hollow cylindrical outer member or race (corresponding to the input member 32b) having a cylindrical inside engagement surface, a hollow cylindrical inner member or race (corresponding to the outside member 34) disposed concentrically with the outer race and having a cylindrical outside engagement surface, a plurality of sprags (cams having a wedging action) placed between the inner and outer races, a member (corresponding to the position control members 64) connected with the steering handle and positioning the sprags, and springs urging the respective sprags in a direction to wedge them between the inside and outside engagement surfaces.

The electric power steering device of the present invention has various advantages described below.

The output member is displaceable in a radial direction relative to the input member. When part of the locking members is disengaged from the output member, forces or pressures applied from the individual locking members to the output member lose balance. The remaining locking members then force the output member to displace in the radial direction relative to the input member. With this displacement of the output member, a frictional engagement force acting between the remaining locking members and the output member is weakened or reduced. This makes it possible to disengage the remaining locking members with a small force just exceeding a force required to overcome the urging members. Accordingly, the friction clutch mechanisms of the present invention can be readily disengaged by a force much smaller than the force required to disengage all the friction clutch mechanisms at one time.

In order to secure a reliable wedging engagement between the locking members and the input and output members, the output member is generally constructed to have a complicated shape and configuration. However, the output member of the present invention is formed by a separate member structurally independent from the output shaft. The output member can, therefore, be manufactured easily at a relatively high rate of production.

Since the position control members are disposed on the same circle and spaced at regular intervals, and since a selected one of the position control members used for positioning the selected one set of friction clutch mechanisms has a circumferential length greater than that of the remaining position control member, the selected one set of friction clutch mechanisms can be disengaged before the remaining set of friction clutch mechanisms. The disengagement of the selected set of friction clutch mechanisms is followed by the disengagement of the remaining set of friction clutch mechanisms which can be readily achieved by a force much smaller than the force required to disengage all the clutch mechanisms at one time.

Since the engagement surface of the output member, which is adapted for engagement with the locking members of the remaining set of friction clutch mechanisms, is sloped down in a direction opposite to the direction of displacement of the output member, the output member is displaced smoothly and stably in the radial direction when the selected one set of friction clutch mechanisms is disengaged. This arrangement is effective to improve the reliability of the clutch disengaging operation.

By virtue of the resilient member used for urging the output member toward the output shaft, the output member automatically returns from the radially displaced position to the original position by the resilient force of the resilient member when the clutch mechanisms are fully disengaged. With the resilient member thus provided, the output member is able to repeat its reciprocating motion with high reliability so as to disengage the clutch mechanisms with a small force. The resilient member has a resilient force acting in a direction parallel to the direction of displacement of the output member. With the resilient force thus aligned with the direction of displacement of the output member, the output member is able to return to its original position smoothly and stably without producing unpleasant operation noise. Thus, clutch mechanisms can therefore operate reliably and silently as a whole.

Since the output member is mounted on the output shaft preferably by an elastic member made of a material having a damping or shock-absorbing property, such as rubber, striking noises which may be produced in the clutch mechanisms can be absorbed or attenuated to a greater extent by the elastic member. The power steering device as a whole has an improved soundproofness, which will increase the product value of the power steering device.

When the output member is displaced in the radial direction relative to the input member, the taper angle correcting portion operates to correct the position of the locking member within the tapering space so as to the wedge angle between the locking member and the frictional engagement surfaces at a substantially constant value. Even when the position of the locking member within the tapering space is changed due to relative movement of the input and output members, the wedge angle and the wedging action of the locking member is kept constant. Accordingly, the locking member can be disengaged smoothly and reliably from the frictional engagement surfaces of the tapering space without requiring an additional clutch-disengaging force. It may occur that due to some reasons, the output member becomes eccentric to the input member and thus changes the position of the locking member within the tapering space. In this instance, however, the taper angle correcting portion operates to correct the position of the locking member until the the constant wedge angle is resumed between the locking member and the frictional engagement surfaces. The taper angle correcting portion thus provided does not affect smooth disengaging operation of the clutch mechanisms which is achievable with a small clutch-disengaging force force.

Since part of the tapering spaces has an enlarged portion, there is provided a great space or clearance between the locking member and the frictional engagement surfaces when the locking member is in the disengaged position. This arrangement insures positive and reliable separation between the locking member and the frictional engagement surfaces and, hence, is able to increase the amount of relative movement between the input member and the output member. The clutch mechanisms can, therefore, be disengaged with improved reliability.

At least one of the plural friction clutch mechanism sets is capable of being disengaged in advance to disengagement of the remaining friction clutch set, and the enlarged portion of the tapering space is provided in said at least one, early disengageable set of clutch mechanisms. With this arrangement, the early disengageable clutch mechanism set is always disengaged first, immediately followed by disengagement of the remaining clutch mechanisms set. By virtue of the enlarged portion, the locking member of each of the early disengageable clutch mechanisms is smoothly received in the enlarged portion when the locking member is forced to disengage from the frictional engagement surfaces. With the locking member thus received in the enlarged portion, clutch disengaging operation of the plural set of clutch mechanisms can be achieved with improved reliability.

Obviously, various minor changes and modifications of the present invention are possible in the light of the above teaching. It is therefore to be understood that within the scope of the appended claims the invention may be practiced otherwise than as specifically described.

What is claimed is:

1. An electric power steering device including an electric motor for generating an auxiliary torque according to a steering torque, and a plurality of sets of friction clutch mechanisms for transmitting the auxiliary torque to a steering system including an output shaft connected to a steering wheel, said plurality of sets of friction clutch mechanisms comprising:

an input member connected to said electric motor;

an output member disposed concentrically with said input member with a space defined therebetween and connected to said output shaft;

a plurality of tapering spaces defined between an inside surface of one of said input member and said output member and an outside surface of the other of said input member and said output member;

a plurality of locking members movably disposed in said tapering spaces, respectively, for selectively engaging and disengaging said input and output members;

a plurality of urging members for urging said locking members toward a tapering direction of said tapering spaces;

a plurality of rotatable position control members connected to said steering handle for positioning said locking members;

rotation of said position control members causing said locking members of said friction clutch mechanisms to move into and out of wedging engagement between said inside surface and said outside surface to thereby selectively engage and disengage said input member and said output member for transmitting the auxiliary torque from said electric motor to said output shaft;

said input member and said output member being mounted such that they are relatively movable in a radial direction;

when a selected one of said plurality of sets of friction clutch mechanisms is disengaged in response to rotation of said position control members, said input member and said output member being relatively displaced in said radial direction by a force exerted from said locking members of the remaining set of friction clutch mechanisms so as to reduce a frictional engagement force acting between said locking members of said remaining set of friction clutch mechanisms and said inside and outside surfaces of said input and output members.

2. An electric power steering device according to claim 1, wherein said output member and said output shaft are composed of two separate members structurally independent from each other, and said output member is mounted on said output shaft such that it is displaceable relatively to said output shaft in a radial direction thereof.

3. An electric power steering device according to claim 2, wherein said position control members are disposed on the same circle and spaced at regular intervals, and a selected one of said position control members used for positioning said selected one set of friction clutch mechanisms has a circumferential length greater than that of the remaining position control member so that said selected one set of friction clutch mechanisms can be disengaged before the remaining set of friction clutch mechanisms.

4. An electric power steering device according to claim 2, wherein said output member has an engagement surface adapted for engagement with said locking members of said remaining set of friction clutch mechanisms, said engagement surface being sloped down in a direction opposite to the direction of displacement of said output member to facilitate smooth displacement of said output member in said radial direction when said selected one set of friction clutch mechanisms is disengaged.

5. An electric power steering device according to claim 2, further including a resilient member for urging said output member toward said output shaft.

6. An electric power steering device according to claim 5, wherein said resilient member has a resilient force acting in a direction parallel to the direction of displacement of said output member.

7. An electric power steering device according to claim 2, wherein said output member is mounted on said output shaft by an elastic member.

8. An electric power steering device according to claim 2, wherein said output shaft has a circular cross section, said output member has a substantially elliptical through-hole in which said output shaft is received, said output shaft and said output member are connected by a pin extending in and along a major axis of said elliptical through-hole, and said output shaft and said output member are urged toward each other by a resilient member.

9. An electric power steering device according to claim 2, wherein said output shaft has an axial slit formed in an end portion of said output shaft so as to form a tongue-like resilient strip, and a pair of parallel flat surfaces extending at right angles to said axial slit and formed by cutting out diametrically opposite portions of an outside surface of said end portion of said output shaft, and said output member has a through-hole fitted with said end portion of said output shaft including said tongue-like resilients trip and said flat surfaces.

10. An electric power steering device according to claim 2, herein said output shaft has an axial slit formed in an end portion of said output shaft so as to form a tongue-like resilient strip, and a pair of parallel flat surfaces extending at right angles to said axial slit and formed by cutting out diametrically opposite portions of an outside surface of said end portion of said output shaft, said output member has a through-hole loosely fitted with said end portion of said output shaft including said tongue-like resilient strip and said flat surfaces, and said output member is supported on said output shaft via an elastic member having damping properties.

11. An electric power steering device according to claim 1, wherein one of said inside surface and said outside surface has a taper angle correcting portion for enabling each of said locking members to wedge between said inside and outside surfaces while keeping the substantially the same wedge angle even when the position of said locking member within the corresponding tapering space is changed due to relative movement between said input member and said output member.

12. An electric power steering device according to claim 11, wherein part of said tapering spaces has an enlarged portion for receiving therein a part of said locking member to allow said locking member to readily separate from said inside and outside surfaces when said locking member is disengaged, said enlarged portion being contiguous to said taper angle correcting portion.

13. An electric power steering device according to claim 1, wherein part of said tapering spaces has an enlarged portion for receiving therein a part of said locking member to allow said locking member to separate from said inside and outside surfaces when said locking member is disengaged.

14. An electric power steering device according to claim 13, wherein at least one of said plural friction clutch mechanism sets is capable of being disengaged in advance to the remaining friction clutch set, said tapering spaces of said at least one set of friction clutch mechanisms each having said enlarged portion.

* * * * *